June 5, 1956  E. J. HIRVONEN  2,748,629
HYDRAULIC CONTROL MECHANISM FOR MACHINE TOOLS
Filed Oct. 30, 1950  18 Sheets-Sheet 1

INVENTOR.
ERIC J. HIRVONEN.
BY Charles R. Fay
atty.

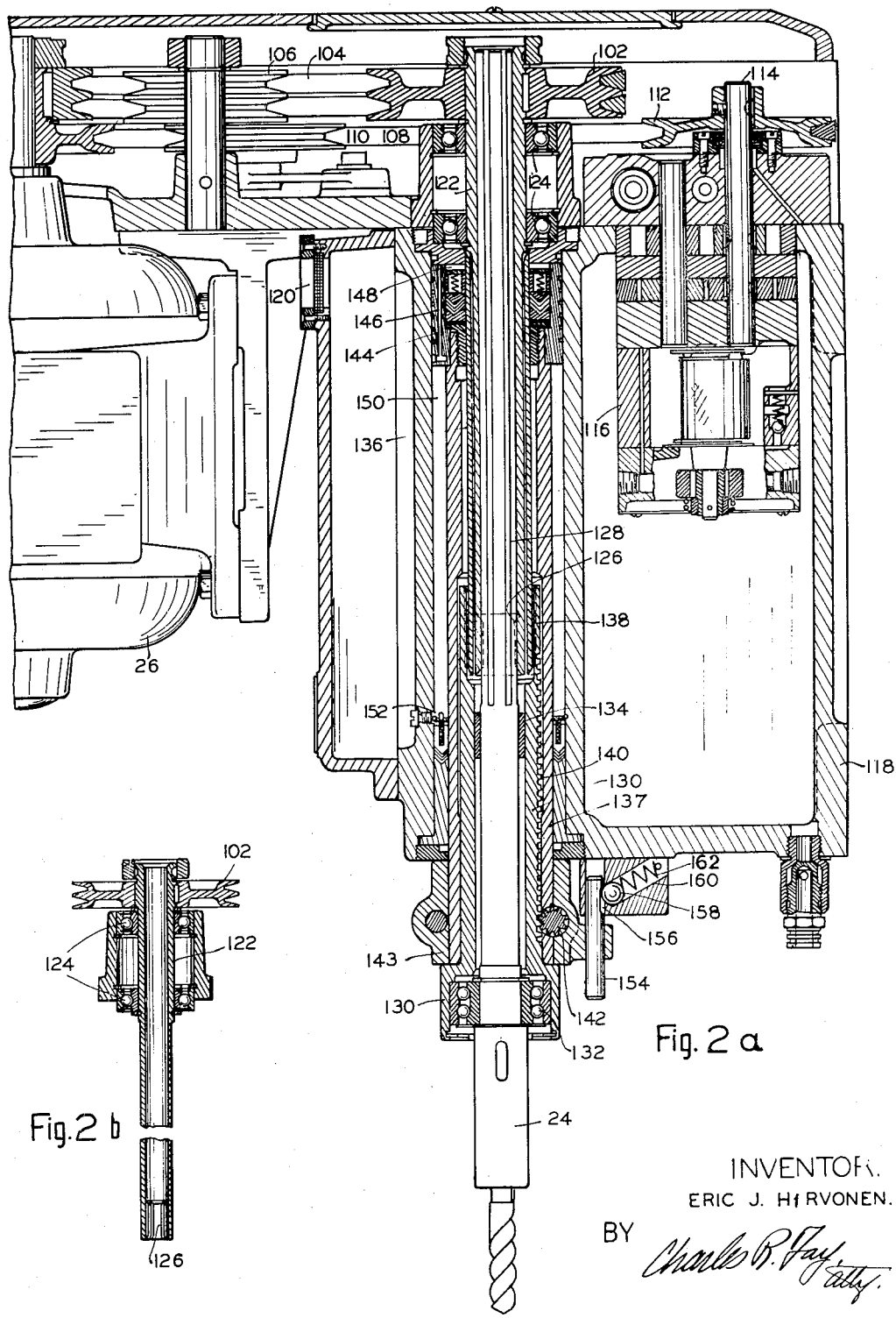

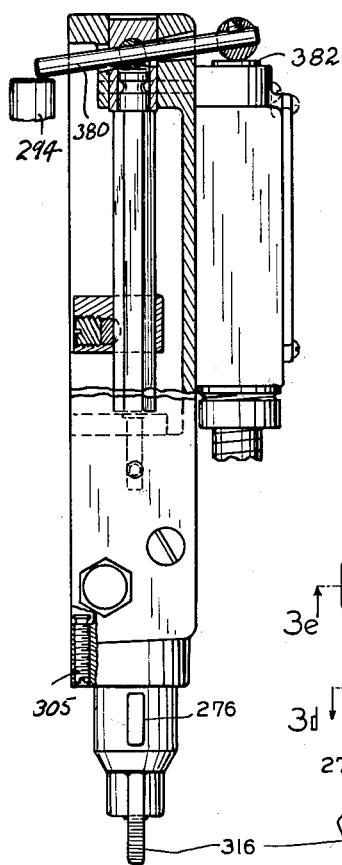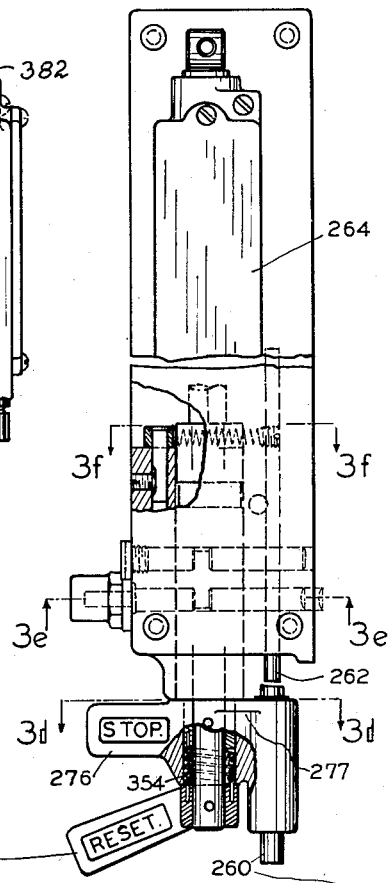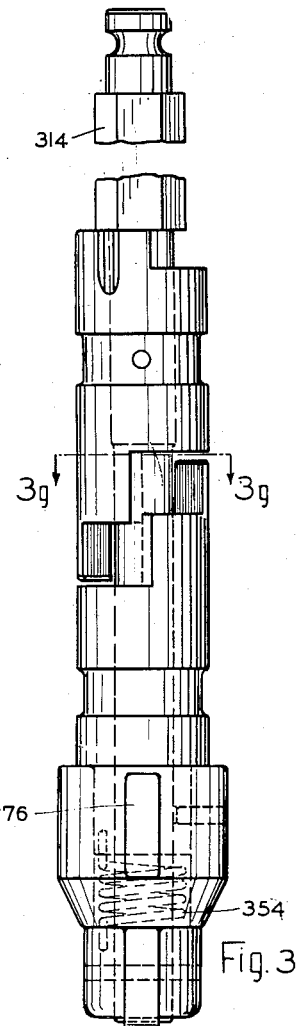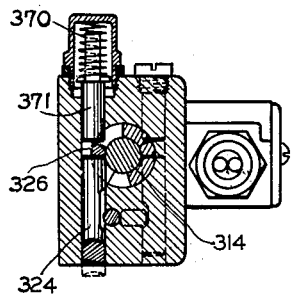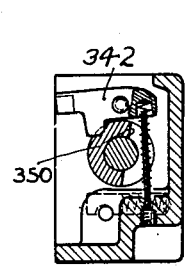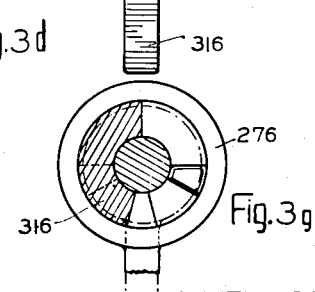
INVENTOR.
ERIC J. HIRVONEN.
BY Charles R. Fay
atty.

June 5, 1956　　　　E. J. HIRVONEN　　　　2,748,629
HYDRAULIC CONTROL MECHANISM FOR MACHINE TOOLS
Filed Oct. 30, 1950　　　　　　　　　　　　　　18 Sheets-Sheet 4

INVENTOR.
ERIC J. HIRVONEN.
BY Charles R. Fay,
atty.

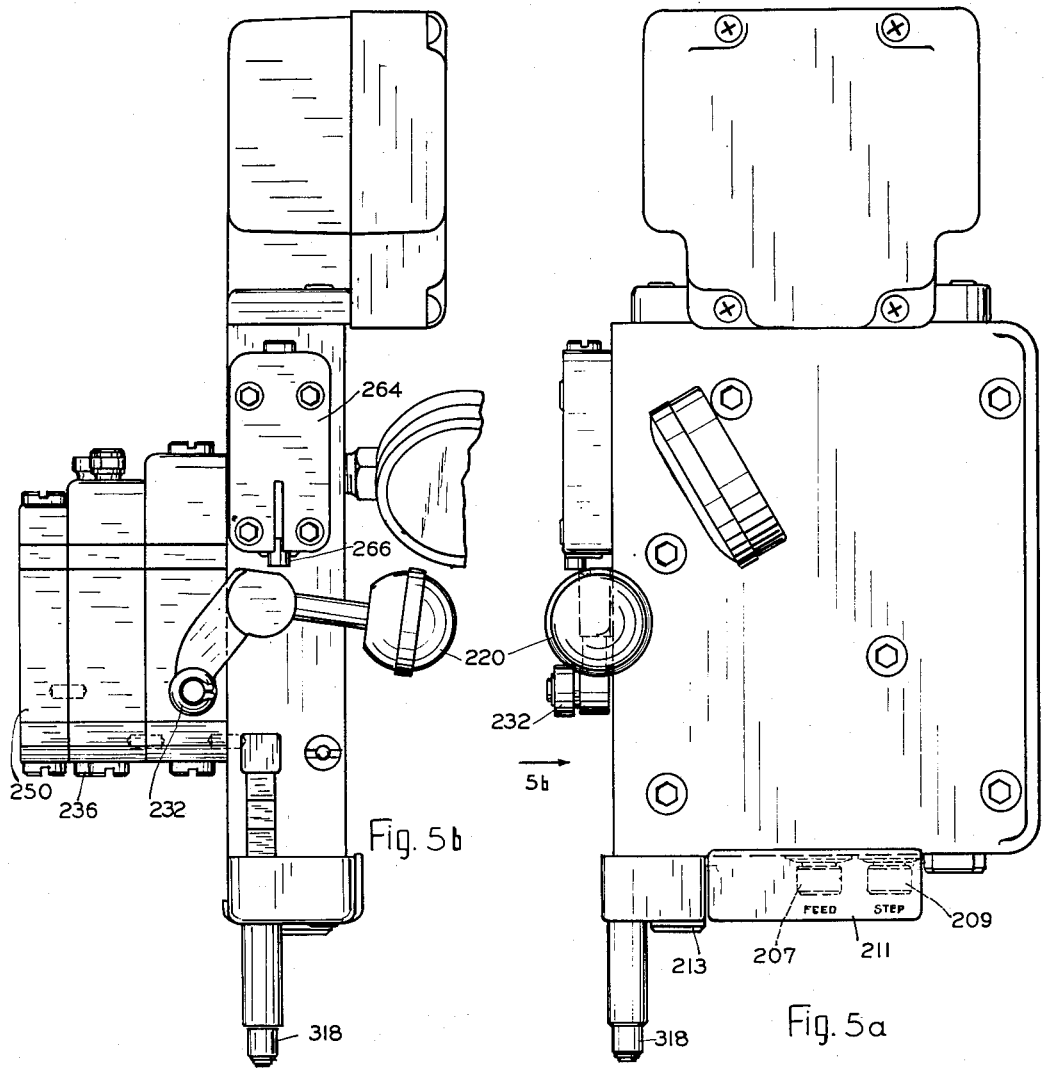
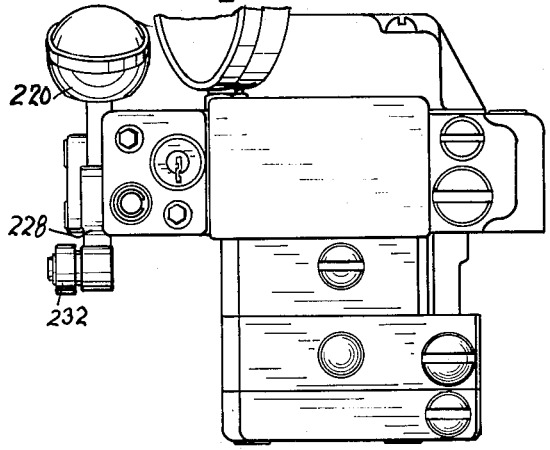

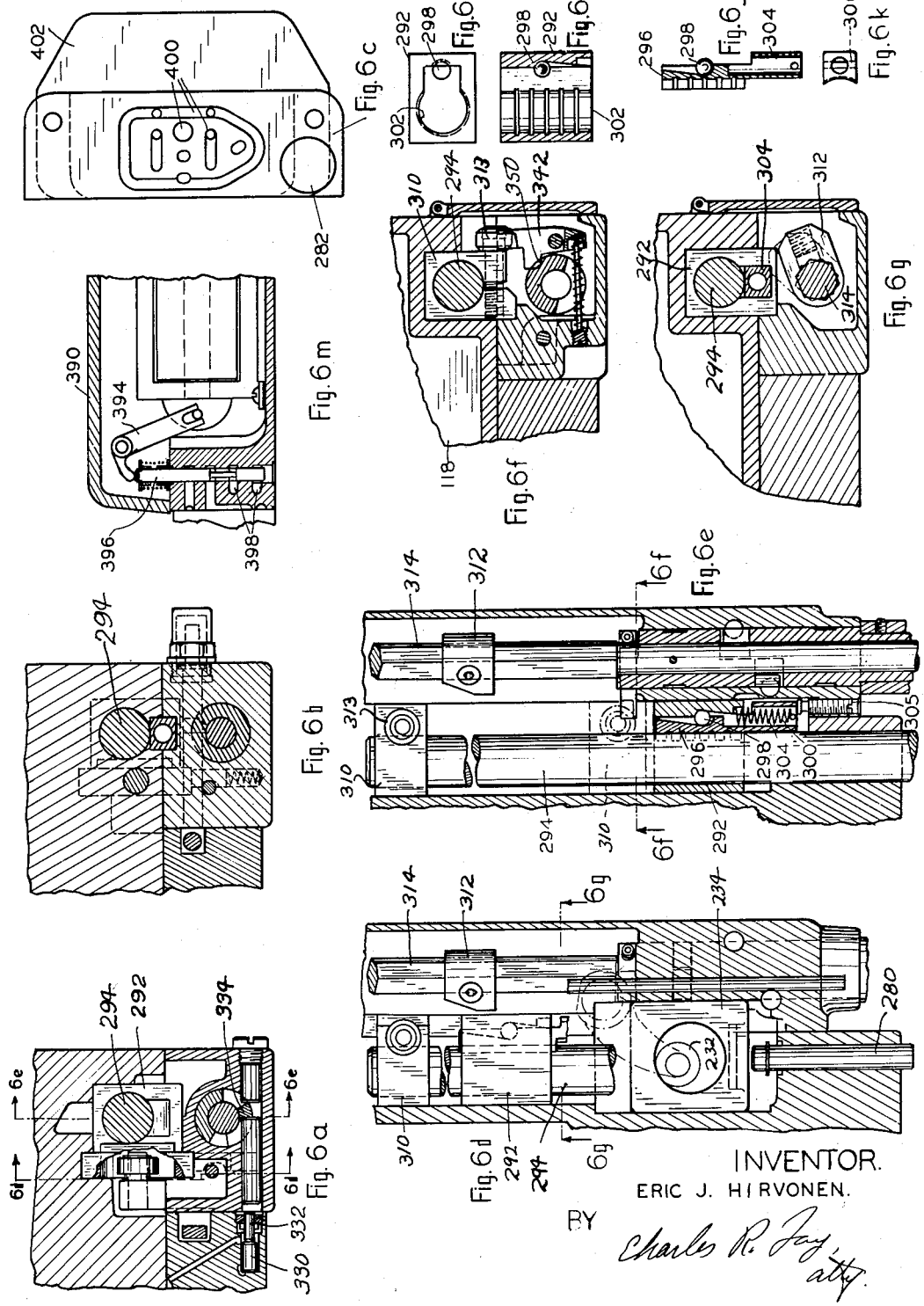

June 5, 1956  E. J. HIRVONEN  2,748,629
HYDRAULIC CONTROL MECHANISM FOR MACHINE TOOLS
Filed Oct. 30, 1950  18 Sheets-Sheet 7
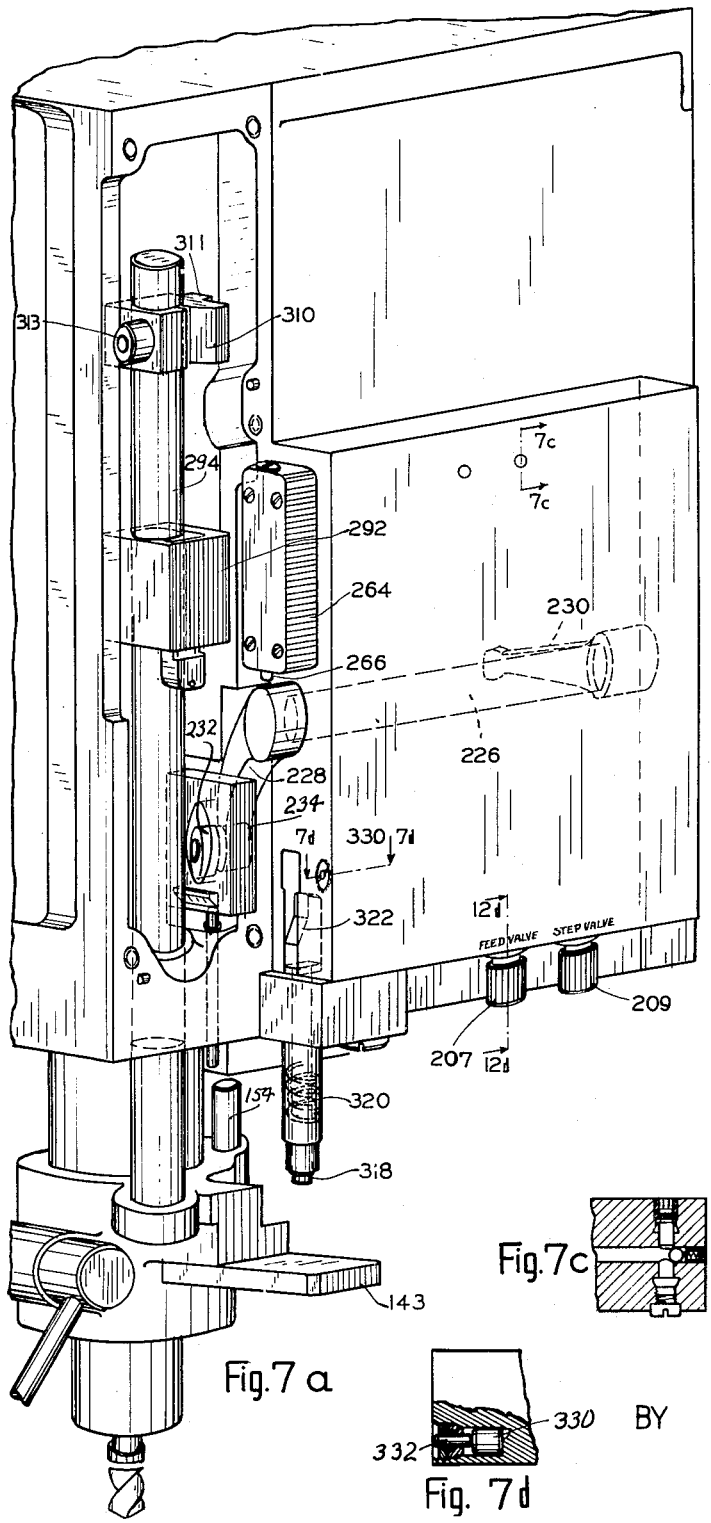
Fig. 7a
Fig. 7c
Fig. 7d
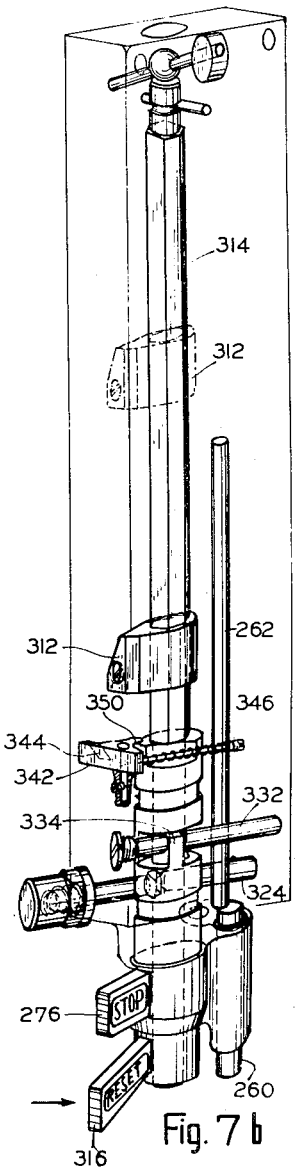
Fig. 7b
INVENTOR.
ERIC J. HIRVONEN
BY Charles R. Fay,
atty.

June 5, 1956  E. J. HIRVONEN  2,748,629
HYDRAULIC CONTROL MECHANISM FOR MACHINE TOOLS
Filed Oct. 30, 1950  18 Sheets-Sheet 8
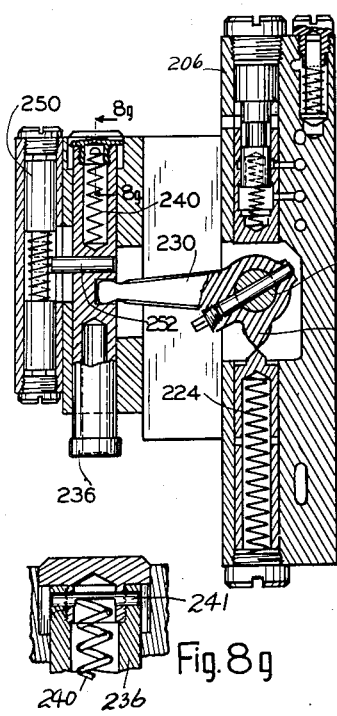
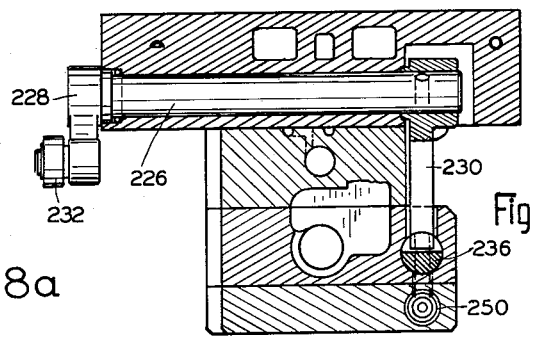
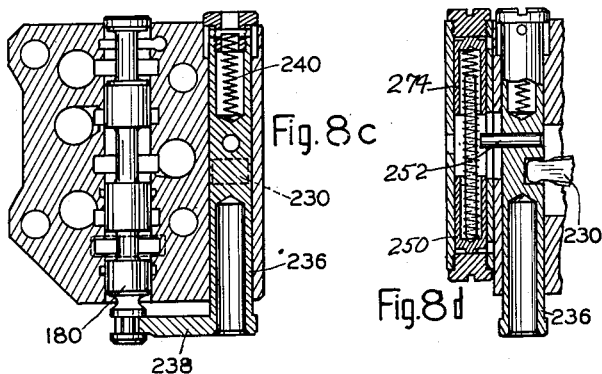
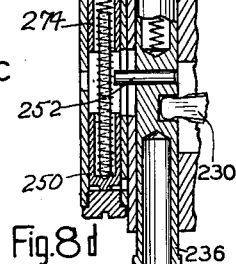
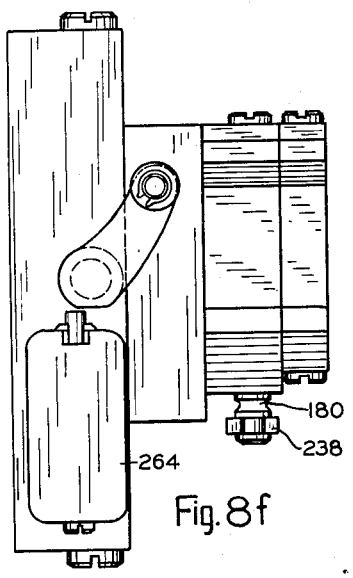
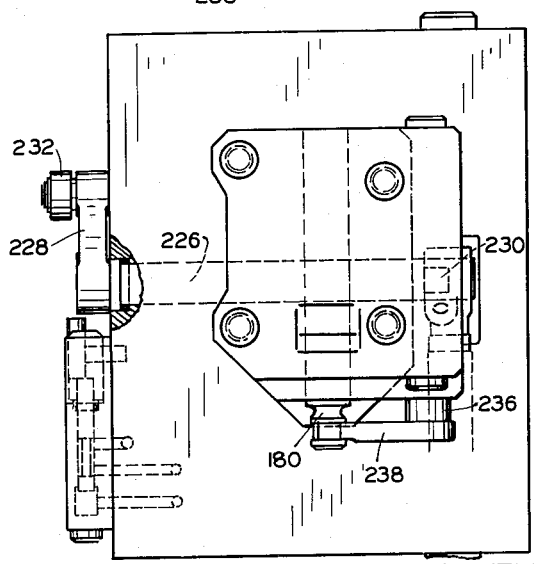
INVENTOR.
ERIC J. HIRVONEN.
BY Charles R. Fay, atty.

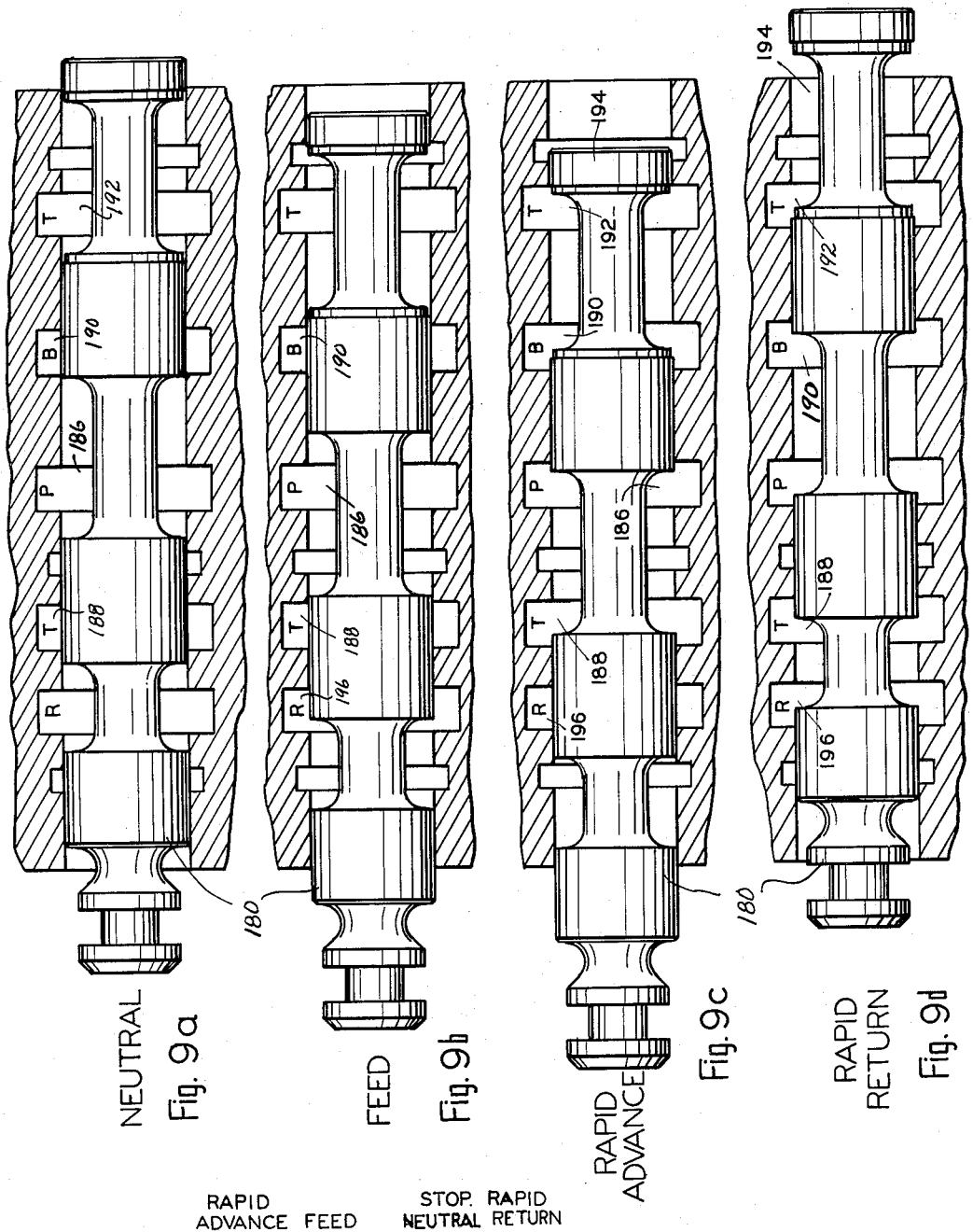

June 5, 1956  E. J. HIRVONEN  2,748,629
HYDRAULIC CONTROL MECHANISM FOR MACHINE TOOLS
Filed Oct. 30, 1950  18 Sheets-Sheet 10
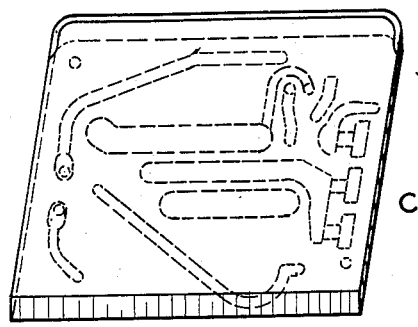
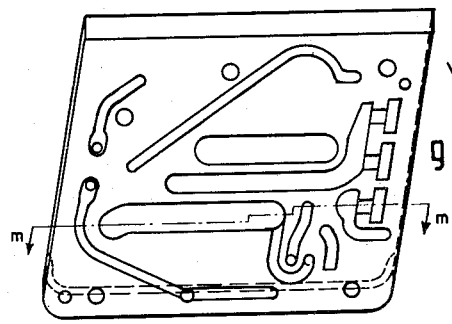
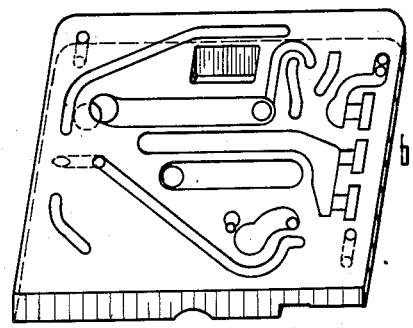
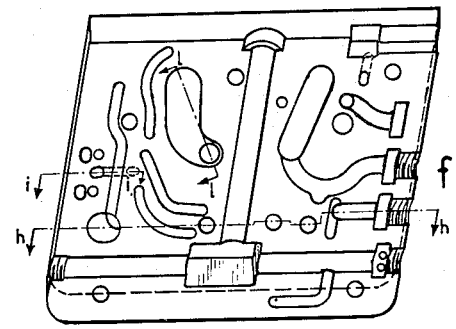
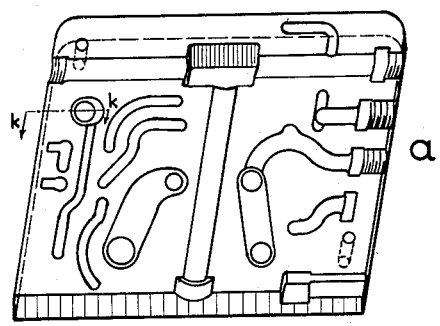
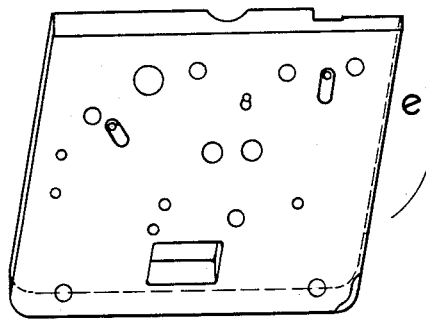
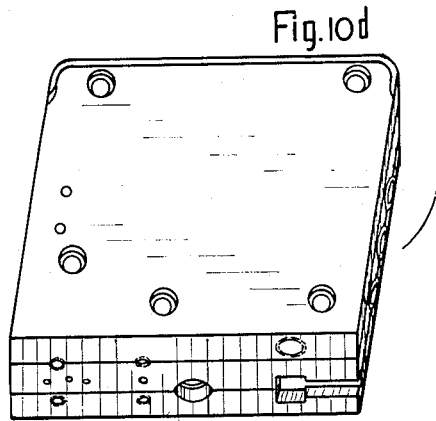
Fig. 10d
Fig. 10h
Fig. 10i  Fig. 10k
Fig. 10l
Fig. 10m
INVENTOR.
ERIC J. HIRVONEN.
BY Charles R. Fay June 5, 1956  E. J. HIRVONEN  2,748,629
HYDRAULIC CONTROL MECHANISM FOR MACHINE TOOLS
Filed Oct. 30, 1950  18 Sheets-Sheet 11
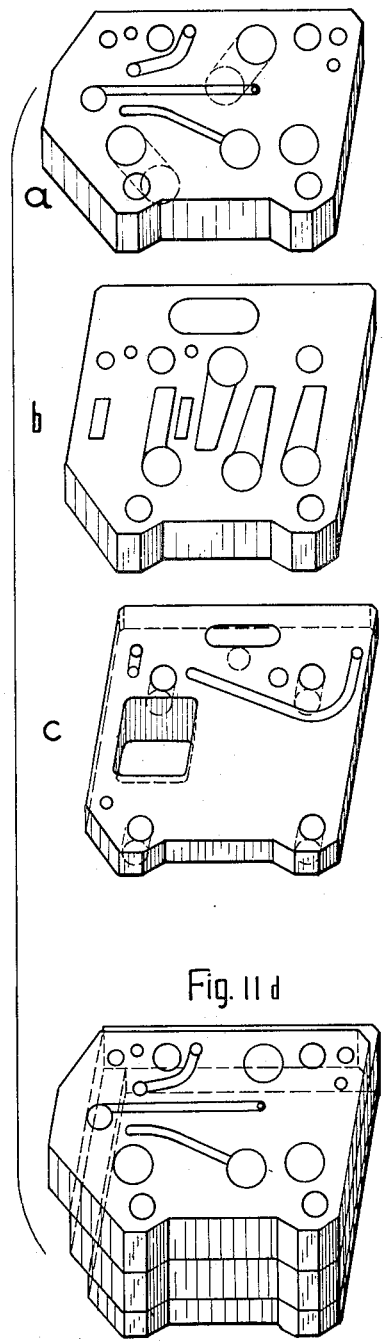
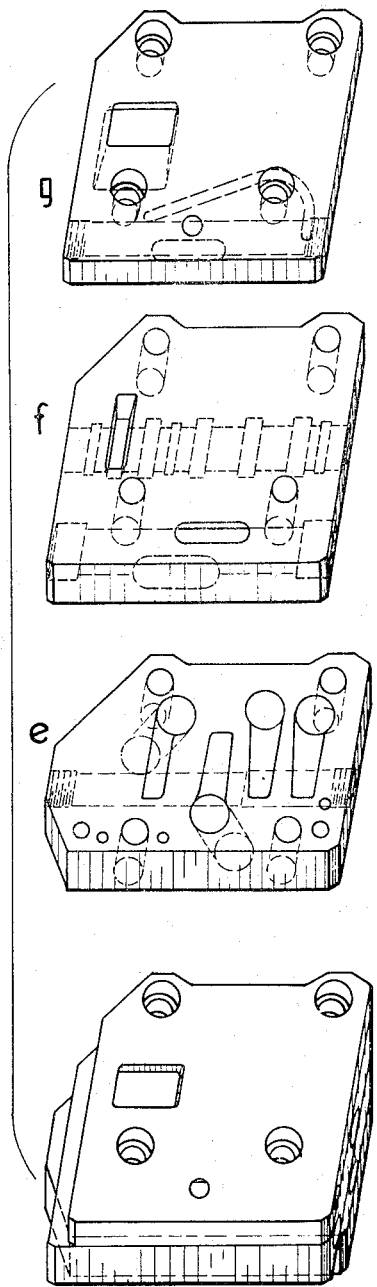
Fig. 11d
Fig. 11h
INVENTOR.
ERIC J. HIRVONEN
BY Charles R. Fay June 5, 1956  E. J. HIRVONEN  2,748,629
HYDRAULIC CONTROL MECHANISM FOR MACHINE TOOLS
Filed Oct. 30, 1950  18 Sheets-Sheet 12

INVENTOR.
ERIC J. HIRVONEN
BY Charles R. Fay
atty.

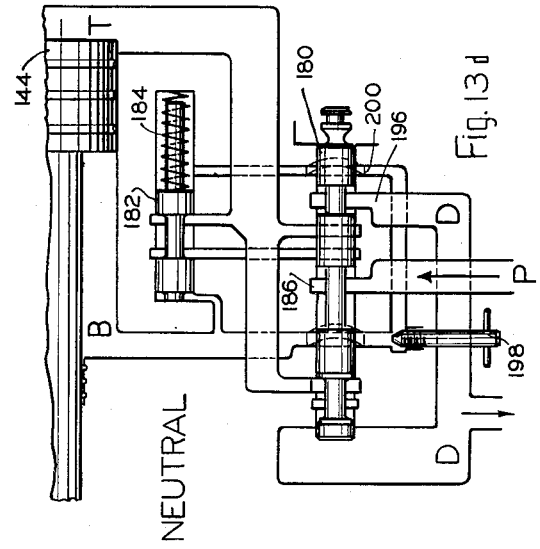
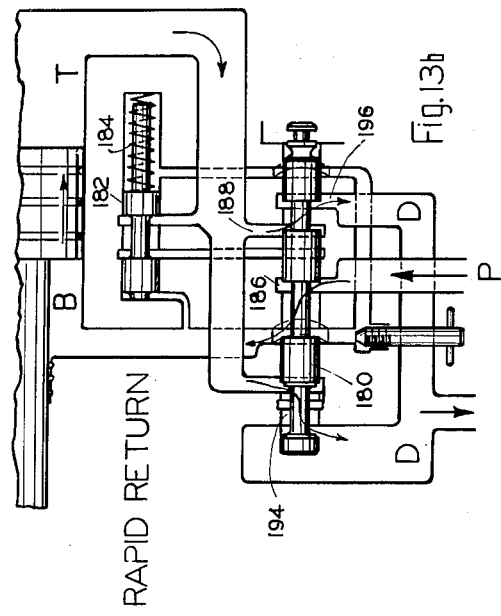
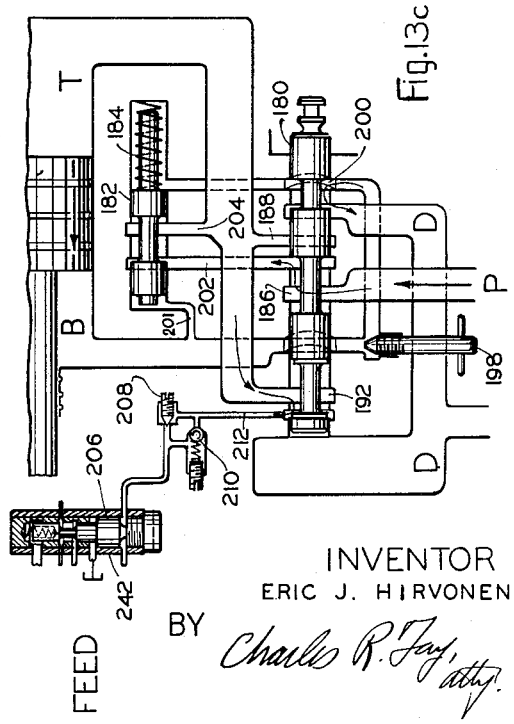
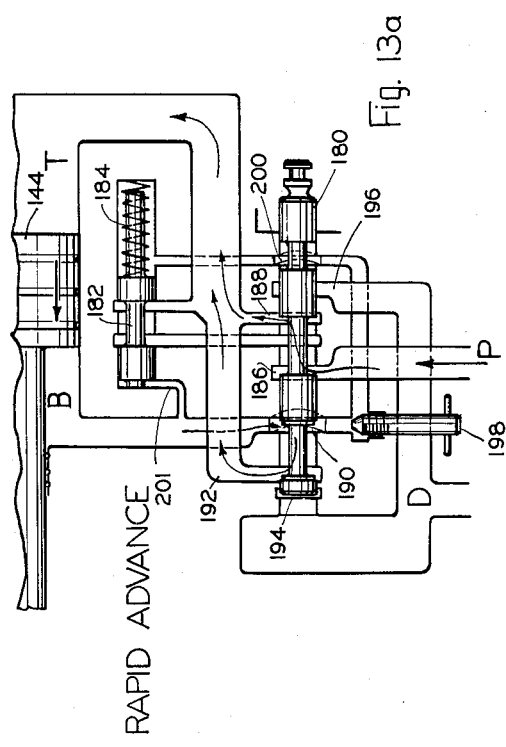

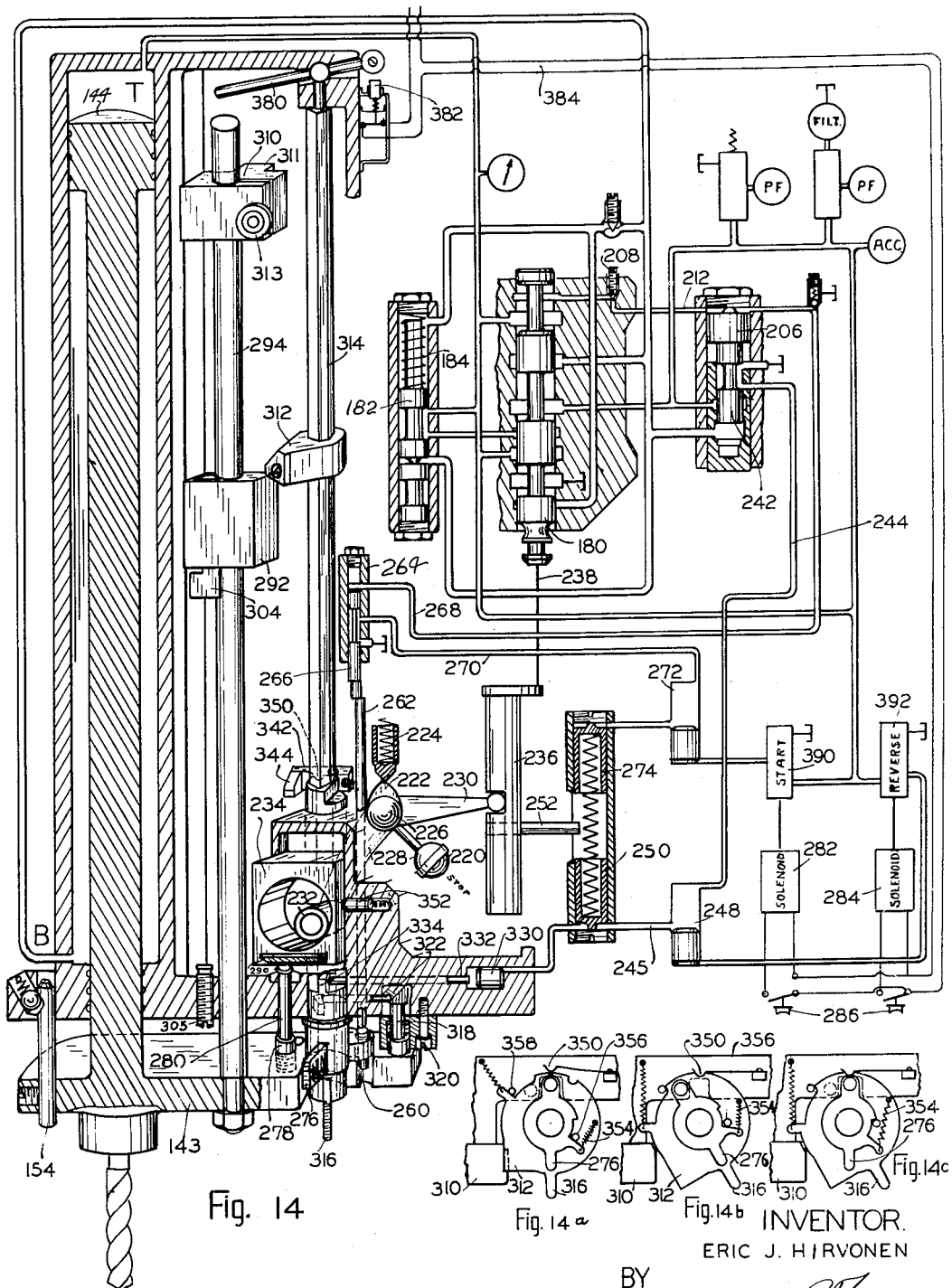

June 5, 1956  E. J. HIRVONEN  2,748,629
HYDRAULIC CONTROL MECHANISM FOR MACHINE TOOLS
Filed Oct. 30, 1950  18 Sheets-Sheet 15

INVENTOR.
ERIC J. HIRVONEN
BY Charles R. Fay,
atty.

June 5, 1956  E. J. HIRVONEN  2,748,629
HYDRAULIC CONTROL MECHANISM FOR MACHINE TOOLS
Filed Oct. 30, 1950  18 Sheets-Sheet 17

INVENTOR.
ERIC J. HIRVONEN
BY Charles R. Fay, atty.

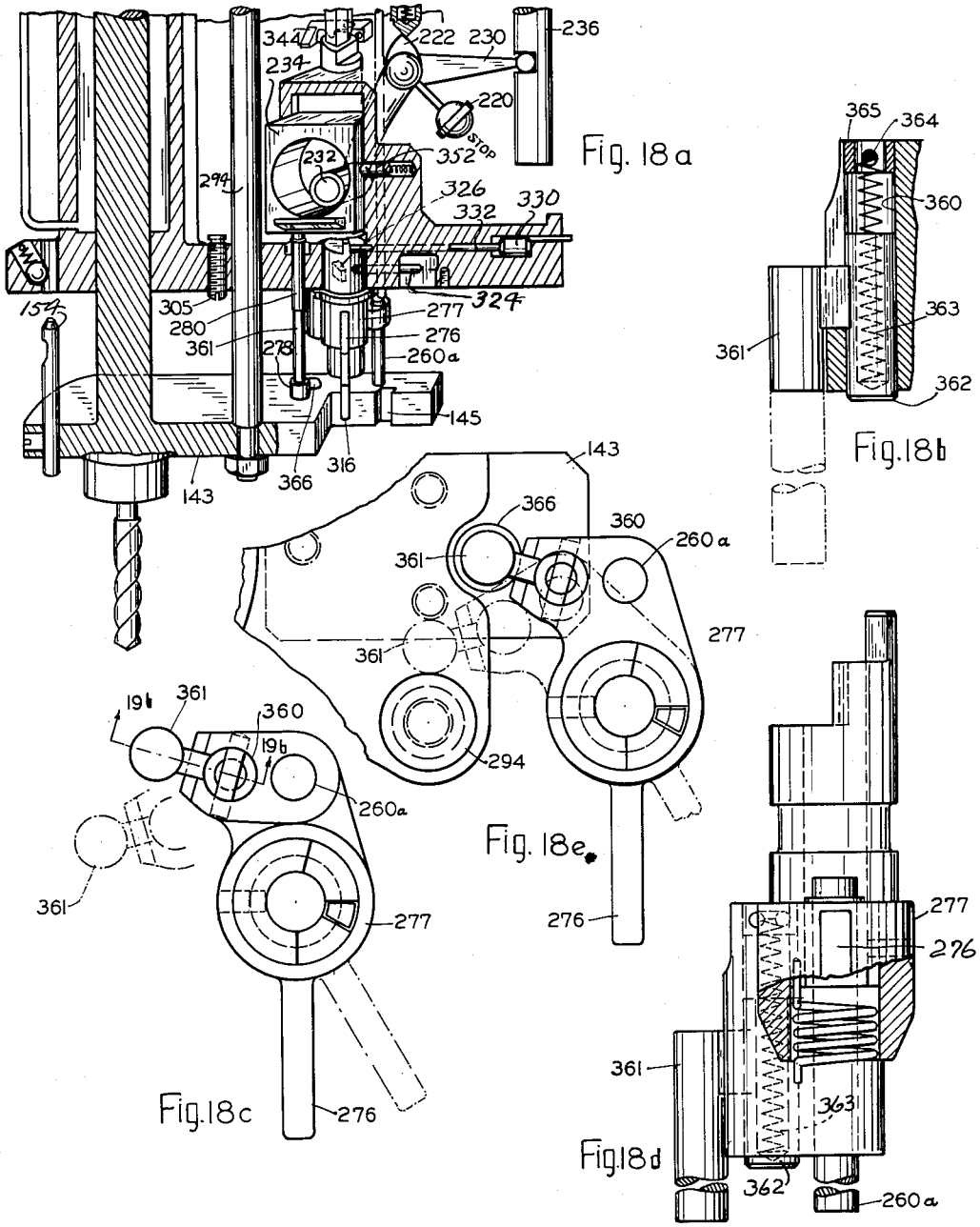

United States Patent Office 2,748,629
Patented June 5, 1956

2,748,629

HYDRAULIC CONTROL MECHANISM FOR MACHINE TOOLS

Eric J. Hirvonen, Shrewsbury, Mass., assignor to Leland-Gifford Company, Worcester, Mass., a corporation of Massachusetts Application October 30, 1950, Serial No. 192,864

22 Claims. (Cl. 77—32.4)

This invention relates in general to tool feeds for machine tools and more particularly to hydraulically actuated machine tool feeds wherein new and improved hydraulic means is provided for imparting four conditions of feed to a tool, i. e., stop or neutral condition, rapid advance until a point is reached where the tool contacts the work, slow feed while the tool is actually operating on the work, and rapid reverse at a point where the tool should be retracted for clearing of chips, application of coolant, etc.

The principal object of the present invention resides in the provision of new and improved means for carrying out the feed conditions of the machine tool as above described, the main features of the present invention residing in extreme flexibility of the apparatus whereby the operator is enabled to set the machine for any conditions of operation desired. For instance, if it is desired to drill an extremely small hole in hard material, e. g., stainless steel, the machine will automatically advance, feed, retract, etc., as many times and as often as is necessary to drill the hole with maximum efficiency and accuracy; and on the other hand, much larger holes may be drilled and drilled much faster in softer materials.

The harder the material, the more steps of feed are required, and the shorter the drilling step will be, but this is easily accomplished by the present machine with a minimum of set-up or adjustment required on the part of the operator.

Further objects of the invention include the provision of hydraulic feed means as above described, in combination with certain new and improved mechanical control devices for controlling the feed cycle above described in a fool-proof manner, whereby it is virtually impossible for anything to go wrong with the work operation and at the same time the machine automatically resets itself for successive holes of like depth without attention on the part of the operator, allowing rapid change of work pieces or locations thereof in between the drilling of the holes. Further, the machine is quickly and easily adjusted to the depth of succeeding holes and also to vary the length of the steps and the speed of the feeding step merely by a turn of a convenient knob, so that the operator may take the fullest advantage of the combination of circumstances involving tool size and hardness of the material and depth of hole, whereby the present machine presents a device having the maximum of efficiency in production work.

Another object of the invention resides in the provision of the various parts of the present apparatus in easily assembled "blocks" or units, each of which is self-contained but so made as to assemble with the other units to exact fit for immediate operation.

A further object of the invention resides in a novel hydraulic system which is self-cleaning and self-regulatory, and in which all parts are automatically connected to drain upon non-operational positioning thereof, avoiding many deficiencies of the prior art.

Still further objects of the invention reside in the provision of devices which insure constant and positive operation of the machine without requiring attention on the part of the operator as to the resetting for successive holes, etc., and at the same time special mechanism is provided making it very easy to change the setting or to reset the machine.

Other objects and advantages of the invention will appear hereinafter.

Reference is to be had to the accompanying drawings, in which

Fig. 2a is a view in vertical section through the drilling head of the present invention;

Fig. 2b is a detail view on a reduced scale illustrating the driving sleeve for the drill spindle;

Fig. 3a is a view in elevation of a control element, parts in section;

Fig. 3b is a view in side elevation thereof, partly in section;

Fig. 3c is a view on an enlarged scale illustrating the relationship between certain parts of the control devices of Figs. 3a and 3b;

Fig. 3d is a section on line 3d—3d of Fig. 3b;

Fig. 3e is a section on line 3e—3e of Fig. 3b;

Fig. 3f is a section on line 3f—3f of Fig. 3b;

Fig. 3g is a section on line 3g—3g of Fig. 3c;

Fig. 5a is a view similar to Fig. 4b but illustrating the part of the control means removed and showing how the same is assembled;

Fig. 5b is a view in elevation of Fig. 5a, looking in the direction of Fig. 5b;

Fig. 5c is a bottom plan view of the subject matter of Fig. 5a;

Fig. 6a is a section on line 6a—6a of Fig. 4a;

Fig. 6b is a section on line 6b—6b of Fig. 4a;

Fig. 6c is a view in elevation illustrating a block containing a starting valve for the device;

Fig. 6d is a vertical section on line 6d—6d of Fig. 4b;

Fig. 6e is a vertical section similar to Fig. 6d but illustrating the slip block and associated parts;

Fig. 6f is a section on line 6f—6f of Fig. 6e;

Fig. 6g is a section on line 6g—6g of Fig. 6d;

Fig. 6h is a top plan view of the slip block;

Fig. 6i is a vertical section therethrough;

Fig. 6j is a vertical section through the cam in the slip block;

Fig. 6k is a bottom plan view thereof;

Fig. 6m is a vertical section through the block of Fig. 6c;

Fig. 7a is a perspective view of the control means and illustrating some of the parts thereof assembled together on the head of the machine;

Fig. 7b is a perspective view of one of the control rods which is omitted in Fig. 7a but which is assembled therewith in the operation of the machine;

Fig. 7c is a section on line 7c—7c of Fig. 7a;

Fig. 7d is a section on line 7d—7d of Fig. 7a;

Fig. 8a is a section through the device controlling the main hydraulic valve;

Fig. 8b is a horizontal section therethrough;

Fig. 8c is a horizontal section through the main valve;

Fig. 8d is a section similar to that of Fig. 8a but omitting the operating shaft;

Fig. 8e is a view in side elevation of a part of the control means;

Fig. 8f is a side view thereof;

Fig. 8g is a section on an enlarged scale of the top end of the operator of Fig. 8a;

Figs. 9a, 9b, 9c and 9d represent the main valve in its four different positions, neutral, feed, rapid advance, and rapid return respectively of the spindle;

Fig. 9e is a diagram illustrating the relative cycle of the main valve;

Figs. 10a, 10b and 10c show in perspective corresponding side surfaces of three plates going to make up a block shown in perspective in Fig. 10d;

Figs. 10e, 10f and 10g show respectively the opposite sides of the plates of Figs. 10a, 10b and 10c;

Figs. 10h, 10i, 10j, 10k and 10m illustrate various sections through these plates on the respective lines indicated;

Figs. 11a, 11b and 11c illustrate another series of plates in perspective, which, when put together, produce the valve block shown in Fig. 11d;

Figs. 11e, 11f and 11g show the opposite sides of the plates of Figs. 11c, 11b and 11c;

Fig. 11h shows the block of Fig. 11d inverted;

Figs. 13a, 13b, 13c and 13d are hydraulic diagrams illustrating the main and regulating valves in rapid advance, rapid return, feed and neutral respectively;

Fig. 14 is a combined perspective and diagrammatic view illustrating the control means for the machine in their operative relations for neutral or stop position;

Figs. 14a, 14b and 14c are diagrammatic views illustrating the relationship between the stop lever and the reset lever;

Fig. 18a is a perspective view of the lower end of the control means and a drill head showing a modification;

Fig. 18b is a view on an enlarged scale, partly in section, illustrating the modification;

Fig. 18c is a sectional view, looking down on the stop lever and illustrating its motion;

Fig. 18d is a view similar to 18b but showing the assembly of the modified device with the stop lever; and Fig. 18e is a view in section illustrating the relationship between the modified device, the stop lever, and the drill head.

Figure 1B:
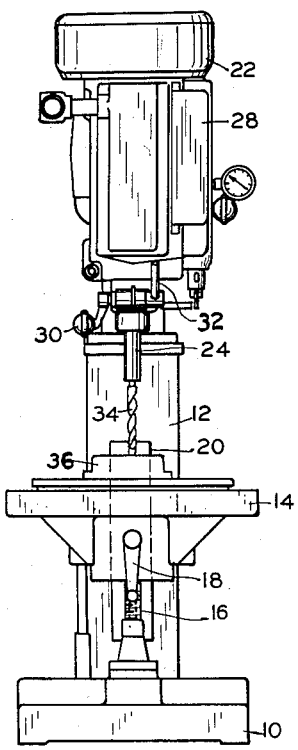
Fig. 1b is a view in front elevation thereof.
Figure 1A:
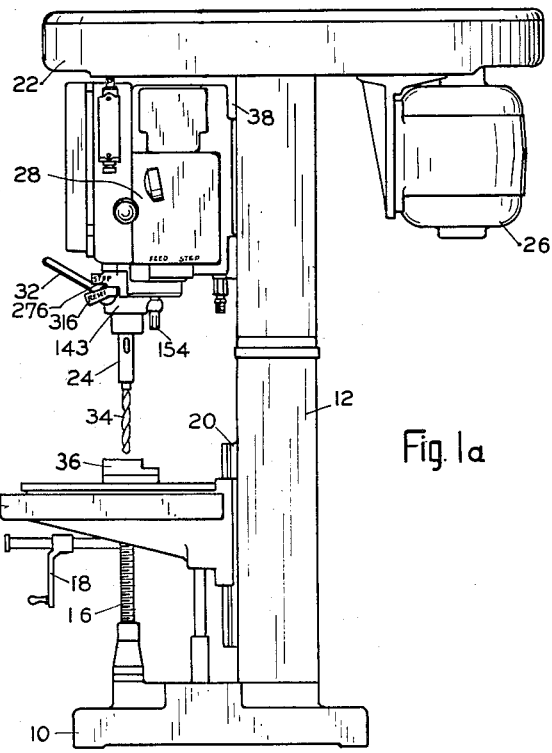
Fig. 1a is a view in side elevation of the machine illustrating the present invention.

This invention is herein illustrated as applied to a drilling machine but is not limited to use in such a machine alone, finding use wherever needed or desired, particularly in the field of machine tools. Figs. 1a and 1b illustrate a vertical machine having a base 10, a standard 12, a table or bed 14 adjusted vertically by a screw 16 and crank 18 or other means along a ways 20 on the standard. The top end of the standard supports a cross member 22 in which are appropriate driving means, etc., to rotate a spindle 24 from a motor 26, preferably at a variety of speeds. This motor depends from the cross member and tends to balance the hydraulic drill-feed mechanism generally indicated at 28 comprising the feed means for the spindle and to which this invention generally relates.

The spindle is vertically adjustable by rotating a handle 30 upon loosening a conventional collar by a handle 32, and in any adjusted position, the spindle has imparted thereto four conditions, i. e., stop or neutral, rapid advance until the point of the drill 34 touches or just about touches the work 36, feed, and rapid reverse.

Figure 1C:
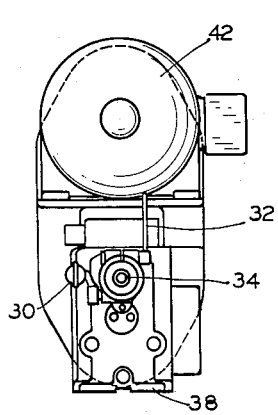
Fig. 1c is a view in front elevation of another machine embodying the same invention.
Figure 1D:
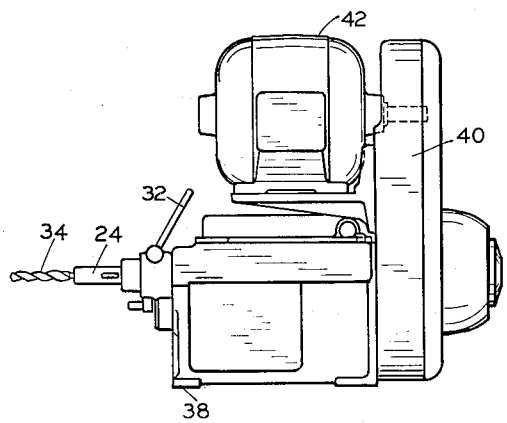
Fig. 1d is a side view thereof.

The same mechanism is set up horizontally as seen in Figs. 1c and 1d wherein the base 38 supports the hydraulic system, pump, etc., and at its end carries a standard 40 mounting motor 42 in driving relation to the spindle, which is exactly the same as in Figs. 1a and 1b.

Whether the spindle is horizontal or vertical, the motor 26 is bolted to the main frame and drives pulley 102 by belt 104 passing over take-up 106, pulley 102 driving the spindle. A belt 108 also driven by the motor passes over take-up 110 and drives pulley 112 on a shaft 114 operating a dual pump 116 according to the invention described in copending application Serial No. 741,139, filed April 12, 1947. The details of this pump are omitted herein but may be referred to as in the application identified.

A housing 118 acts as a reservoir for the fluid used to feed and retract the spindle and appropriate passages for the fluid are provided in the walls of the housing and a set of blocks to be described. An air-outlet is provided at 120, this outlet having a filter to contain the fluid but pass air.

Pulley 102 is keyed to drive a sleeve 122 having bearings 124 maintaining the sleeve axially fixed. The sleeve depends and is provided at its lower end interiorly thereof with a set of axially directed splines 126 keyed to the spindle 24 as at 128 for rotational driving of the spindle by the sleeve and axial adjustment of the former relative to the latter. The spindle is rotarily journalled in a sleeve 130 as at 132 and 134, the latter bearing being made in such a way as to cause the spindle and sleeve 130 to move axially together. However, the sleeve 130 is fixed against rotation by a sleeve or cylinder 136 splined to sleeve 130 as at 138, and has a rack 140 operated by a gear 142 to manually adjust the spindle relative to the work. Gear 142 is located in head 143 which reciprocates to feed and retract the tool spindle.

Cylinder 137 reciprocates with head 143, the spindle, and sleeve 122, and at the upper end it carries a piston arrangement 144 including rings, packing, etc. The member 146 is the cylinder for this piston, and the reference numeral 148 indicates the "top" or pressure side thereof, which has twice the area of the "bottom" side of the piston as represented by the space 150. The fluid is of course pumped from the dual pump to the top of the cylinders and exhausted at 152 to the reservoir, as will be described.

In Fig. 2a the piston, spindle, etc. are at the extreme upper limit of travel, and on the head there is arranged a post 154 having a notch 156 receiving a ball 158 in an inclined bore 160. A spring 162 urges the ball down to the left. The angularity of the bore is such that the ball cannot be displaced up to the right merely by the weight of the reciprocal structure, but needs pressure applied thereto to release the head. On the other hand, the post easily displaces the ball as the structure rises to approach the extreme upper limit, and the spring urging the ball into the notch automatically locks the head, spindle, etc. in uppermost position. The normal range of reciprocation during operation on work does not include a head position as high as that of the locked position shown in this Fig. 2a.

Figure 12:
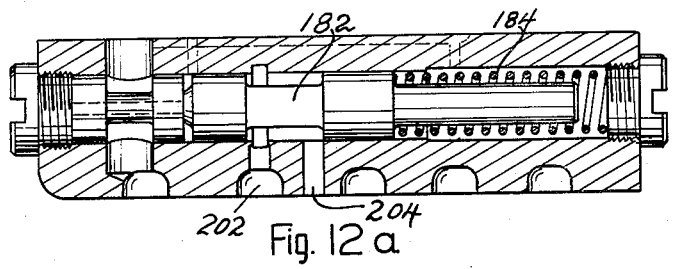
Fig. 12a is a section through the regulating valve.
Fig. 12b is a section through the restarter valve.
Fig. 12c is a section on line 12c—12c of Fig. 12b.
Fig. 12d is a section through one of the regulating valves.
Figs. 12e, 12f, 12g, 12h and 12i illustrate details thereof on an enlarged scale.
Figure 12:
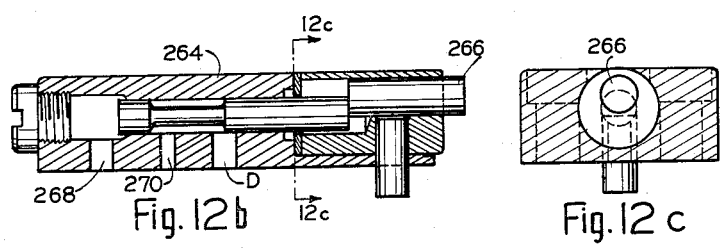
Figure 12:
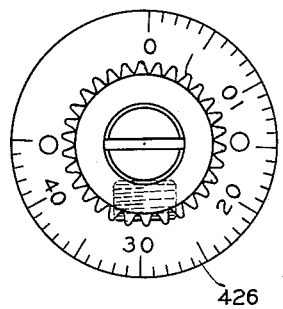
Figure 12:
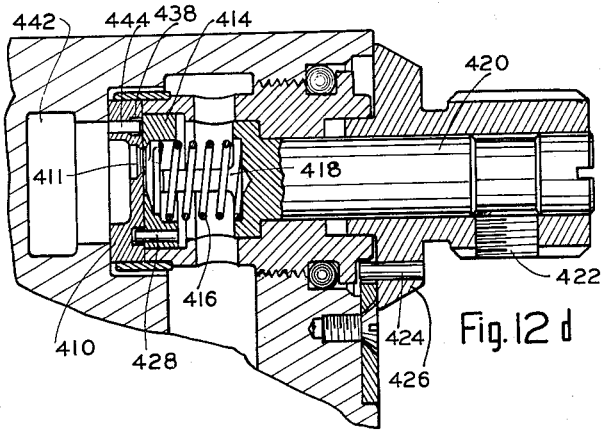
Figure 12:
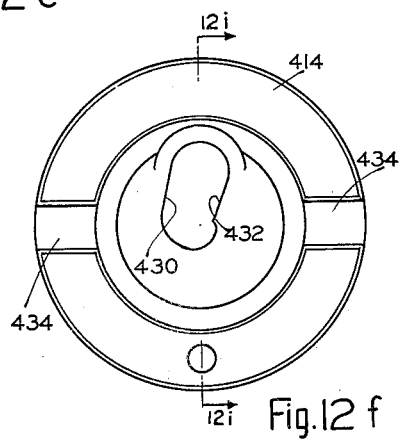
Figure 12:
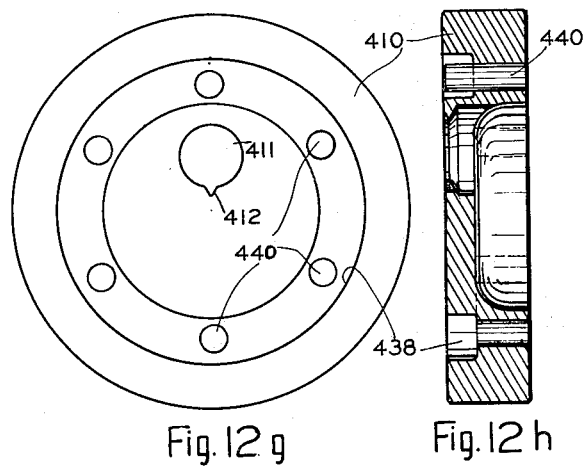
Figure 12:
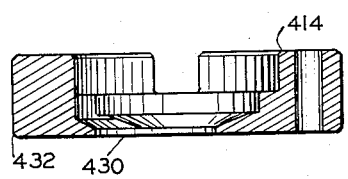
Figure 15:
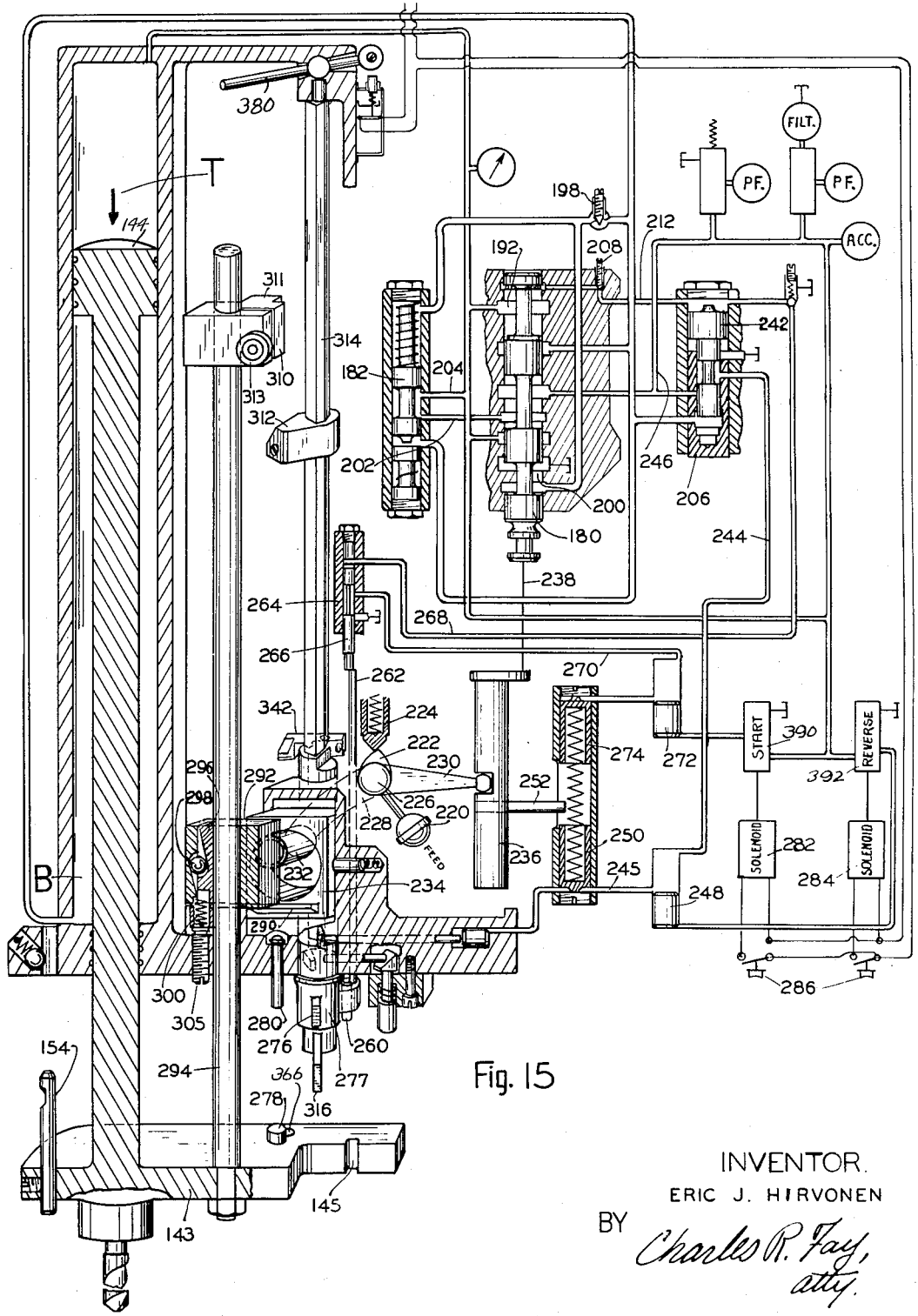
Fig. 15 is a view similar to Fig. 14 showing the parts in feeding condition.

Figs. 13c and 15 show the main valve 180 and self-regulating valve 182 for the speed of the spindle feed. The main valve has four positions, see Figs. 9, 12 and 13 and is moved through the cycle of these positions by a combined hydraulic and mechanical means to be described. The cycle is neutral, rapid advance to the work or bottom of hole so far drilled, feed, and rapid retraction. Neutral or stop position is shown in Fig. 13d, the piston 144 is at the top of the cylinder, represented by T, B representing the bottom or lower side of the cylinder. The self-regulating valve is at the left, held there by spring 184, and all ports are closed. P represents the pressure derived from the dual pump and D the reservoir or sump. Ordinarily, the neutral or stop position infers that the spindle is at the top or extreme retracted position, just prior to the rapid advance, but during operation this is not as far retracted as the position shown in Fig. 2a where the head is locked by the post 154.

Referring now to Fig. 13a wherein is shown the condition of the main valve for rapid advance to the work or to the bottom of the hole thus far drilled, the piston and spindle are seen to be travelling to the left in this figure. Fluid under pressure at P enters the valve at 186 and flows to the top of the cylinder at 188. Fluid under back pressure at B flows to the valve 190 and thence to the top of the cylinder at 192 to increase the volume of fluid demanded without the necessity of returning to the sump to be repumped, thus greatly enhancing the speed of the spindle. The one return to the sump indicated at 194 is closed and the same is true of that at 196. A small flow of fluid from B past the metering valve 198 goes to the self-regulating valve 182 at port 200 and keeps this valve in balance.

When the tool spindle reaches the work, a mechanism to be described throws the main valve into the feed position, Figs. 13c and 15, and here the port 188 to the top is cut off, the fluid being directed through port 202 to the regulatory valve 182, thence to port 204 to the top T. The fluid from the bottom B neither flows to the top nor drains except through the metering valve 198 which is easily manually adjusted as is clear to vary the speed of the feed. This fluid passes port 200 to the sump D and clearly allows but slow progress of the piston. The back pressure at B also acts to move the valve 182 to the right through passage 201 so as to tend to cut off pressure to the top at 202 when the back pressure exceeds that determined by the metering valve, so that the valve 182 is seen to be self-regulating.

A special feature of the present invention resides in a manual adjustment of the lengths of the feed steps of the tool spindle as well as the speed of the feed, and this is accomplished by a special valve 206 (see Figs. 13c and 14) operated by pressure from valve 180 at 192 passing a manually adjusted metering valve 208, and past an overload bypass 210 through passage 212. If an excess of pressure at the cylinder top is required to move the piston, pressure in 212 rises and shifts valve 206 to throw the main valve into rapid return, as will be later described. However, the degree of pressure necessary to achieve the reversal is determined by manual adjustment of valve 208.

Figure 16:
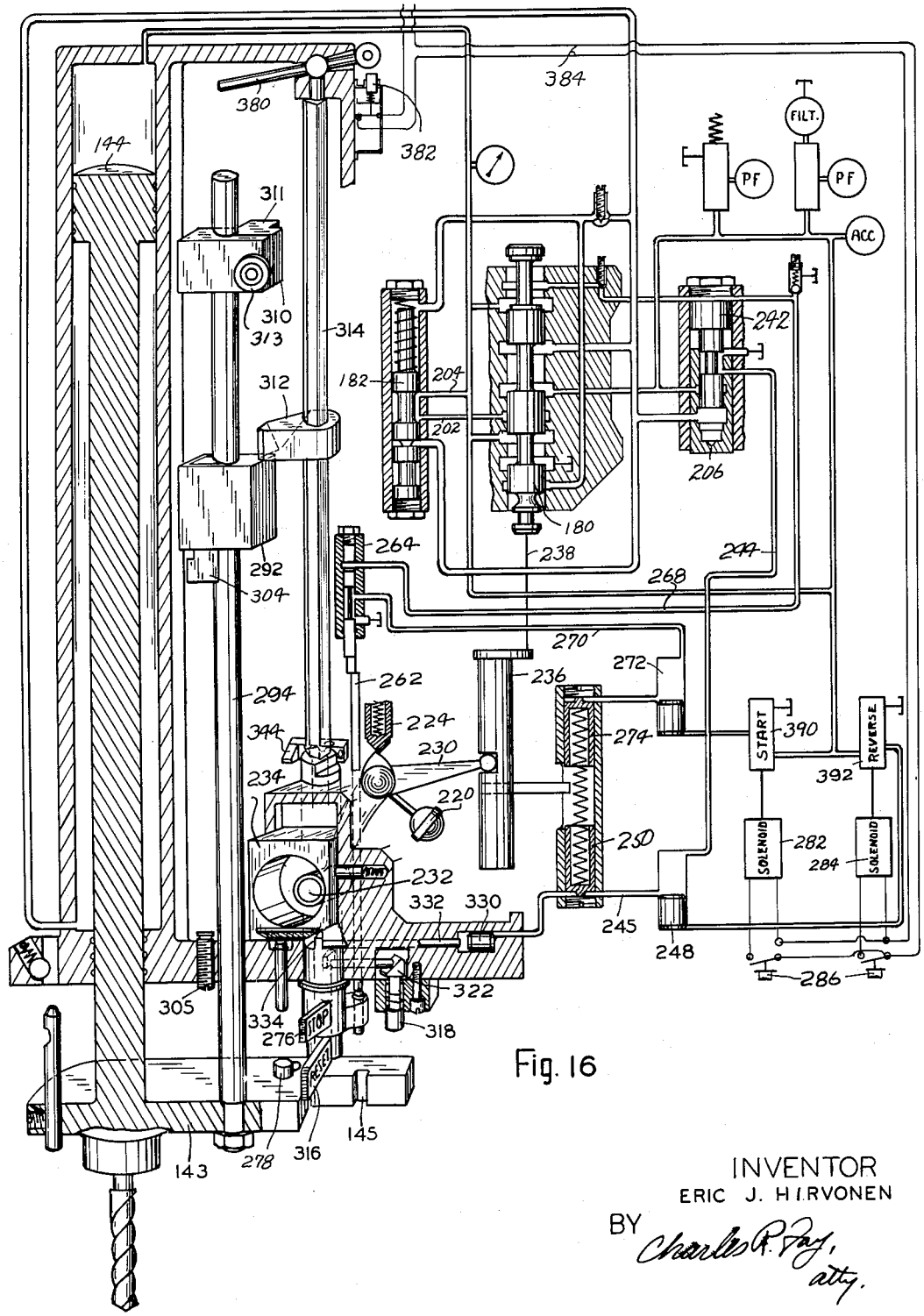
Fig. 16 is a view similar to Fig. 14 illustrating the parts in the condition for rapid return.

The rapid return of the spindle is shown in Figs. 13b and 16 wherein the valve member 180 is in an extreme position to provide direct drain from the top of the cylinder at 194 and also at 196 while the pressure is directed to the bottom of the piston by port 186. The valve 182 is again moved to the left in Fig. 13b, being overbalanced by the spring 184.

It is to be noted that rapid advance and rapid return are at opposite extremes insofar as main valve 180 is concerned and feed and neutral are closer together and more centrally located. This is shown in simple line diagram form in Fig. 9e. Mechanical means are provided to releasably hold the main valve in these positions, see manual handle 220 having a pointed projection 222 which may be located at either side of a spring-pressed plunger 224, see Fig. 8 also Figs. 14–17 inclusive, but not aligned therewith. Hence the main valve cannot be stuck at any midway point unless the mechanical means holds it in some midway position.

The handle 220 rocks on an axis at 226 and although it may manually set the main valve to any of its four positions, it is operated by a pair of arms 228 and 230. Figs. 14–17 inclusive show the construction clearly in simplified diagrammatic form, and Figs. 8a, 8b, 8c, etc., show the construction mechanically as it appears.

Arm 228 has a roller 232 at its end, the roller being located in a round hole in a control block 234. Clearly the position of the control block determines that of the roller and therefore that of axle 226 and handle 220. The same is true of arm 230 which has an end in a notch in a control plunger 236. This plunger is directly connected to an end of main valve member 180 by a link or the like 238, see Fig. 8d. The control lever has a spring 240 and a cap on one end with a slotted pin retainer 241 which makes assembly more convenient and prevents accidental displacement.

Plunger 236 and valve 180 are therefore controlled by the position of block 234, but also by valve 206, by solenoid start or reverse button, by starting valve 264 and last by lever 220. The control valve 206, called the "step" valve hereafter, has a body 242 movable by pressure in passage 212 past the adjustable timer valve 208 to connect line 244 to the pressure from the pumps, see line 246, and shoves slug valve 248, if not already out of the way, to one side, so as to move a plunger 250 and therefore plunger 236 by a connection 252. This causes valve 180 to snap to rapid reverse position from feed position, the latter being the only position to allow pressure to exist in line 212.

The valve 206 is the means reversing the spindle and as described operates only on excess predetermined pressure demand at T, as regulated or adjusted for by manual valve 208. Hence the spindle reverses automatically on marked increase of tool resistance, but the degree required to change to rapid return is controlled by the operator at will. Also, the point 222 (Fig. 8a) snaps over to extreme position opposite the side of plunger 224 which called for feed, the immediately prior position, insuring positive operation of the plunger 236.

The head 143 of course rises and ordinarily will strike a plunger 260, see Fig. 7b, which then rises and moves rod 262 to actuate a restarter device 264, Fig. 7a. This raises plunger 266 to connect pressure line 268 to line 270 to move slug valve 272, if not already in the right position, to one side to apply pressure to plunger 274 to force plunger 236 oppositely, snapping over the point 222 to the extreme opposite side and moving valve 180 to rapid advance. However, if stop lever 276 should be moved to the left, plunger 260 will not be struck by the head 143 which is cut out at 145 to avoid the plunger. The restarter will not operate, hence the head will rise to move block 234 by button 278 and plunger 280 to move arm 228 clockwise and hence plunger 236 to stop or neutral position of valve 180. The stop lever 276 is mounted on an oscillatory collar 277 which carries plunger 26 in a vertical bore therein.

Slug valves 248 and 272 are also appropriately actuated as by solenoids 282 and 284 to start or reverse the piston as desired by the operator at any time. The solenoids have push buttons 286 controlling the same in convenient reach of the operator.

The position at which the main valve 180 is moved to feed position depends on block 234 controlling arm 228. Block 234 has a ledge or lip 290 which is engaged by a slip block 292, see Figs. 6e, 6f, etc. This slip block descends at each stroke with rod 294 which it grips by cam 296, ball 298, and spring 300, the latter tending to move cam 296 to the right in Fig. 16, or left in Fig. 6e. The slip block has a bore 302 of which cam 296 forms a section, to receive rod 294, and the cam has a cylinder 304 to receive spring 300. A double-end tabbed key 306 is located transversely of the cylinder and effectively prevents loss of spring 300 permanently.

Assuming the slip block to be fairly low on rod 294 as originally set to the work, the machine being started on rapid advance, the rod 294 of course descends. The slip block strikes the lip 290 and depresses block 234, but meanwhile the cylinder 304 is held up by adjusting screw 305 and an equilibrium is reached in a position where block 234 rests in feed position. The only mechanical adjustment to determine how light or how hard the drill approaches to the workpiece is accomplished by this screw 305 to determine the feed position for main valve 180. The slow feed lasts until reversal, i. e., until actuation of valve 206 causes rapid reverse to take place. Meantime, the slip block has been slipping up relative to rod 294 to a degree the same as the length of hole drilled in the work. Hence on the next step the feed will not again start until the drill has rapidly traversed the already drilled hole. The adjustable screw 305 causes the slip block to slip by engaging the lower end of cylinder 304 and relatively pushing upon the same to loosen the cam 296.

The above described cycle takes place until a stop block 310 finally contacts the top of block 234 and throws the latter to rapid reverse. Block 310 may be adjusted to any depth of hole but does not operate until slip block 292 reaches it in the relative slipping step-by-step travelling up the rod 294. Block 310 determines the depth of hole to be drilled, and extension 310a occasions a complete recycling of the hole by means of the block 312 mounted non-rotatably on but adjustably lengthwise on non-round rod 314.

Figure 17:
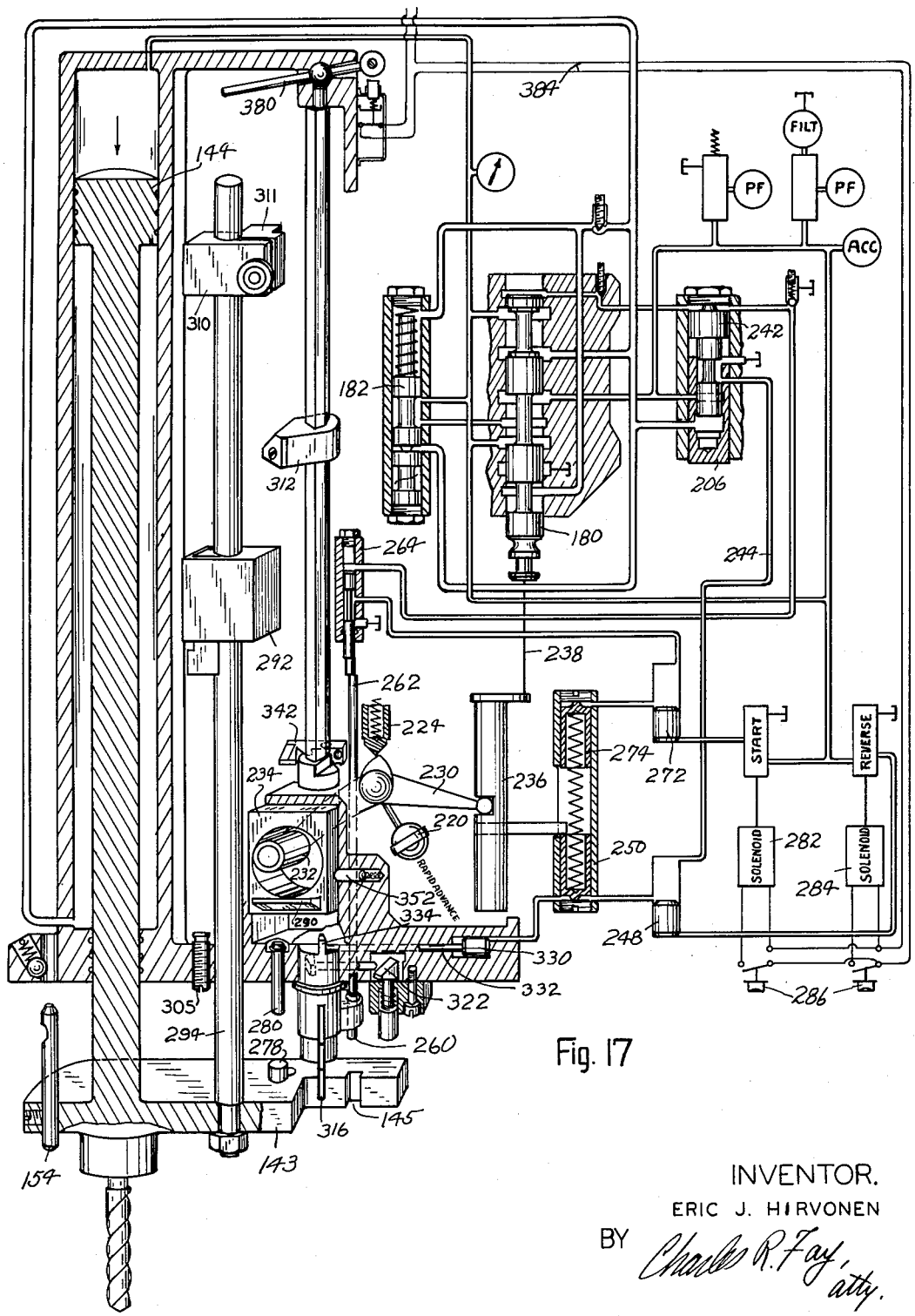
Fig. 17 is a view similar to Fig. 14 illustrating the parts in condition for rapid advance.

The block 312 resets the slip block 292 by being present in the path of the latter and contacting the top thereof, see Fig. 17. The reset block 312 is adjustable up or down on rod 314 and of course accomplishes its resetting function to a point on rod 294 of slip block 292 according to the vertical position of the re-setting block, so that as rod 294 rises, block 292 strikes block 312 and is forced relatively downwardly along rod 294.

The re-setting block 312 ordinarily does not remain in the path of the slip block, being in this position only on the last upward stroke of rod 294 after the hole has been drilled. A reset lever 316 controls the oscillation of rod 314 and it may be manually or automatically actuated as desired thereby. Fig. 14 shows the block 312 moved to the right enough to avoid slip block 292, see Fig. 6g, and this is done by a reset release device.

Figures 4A, 4B:
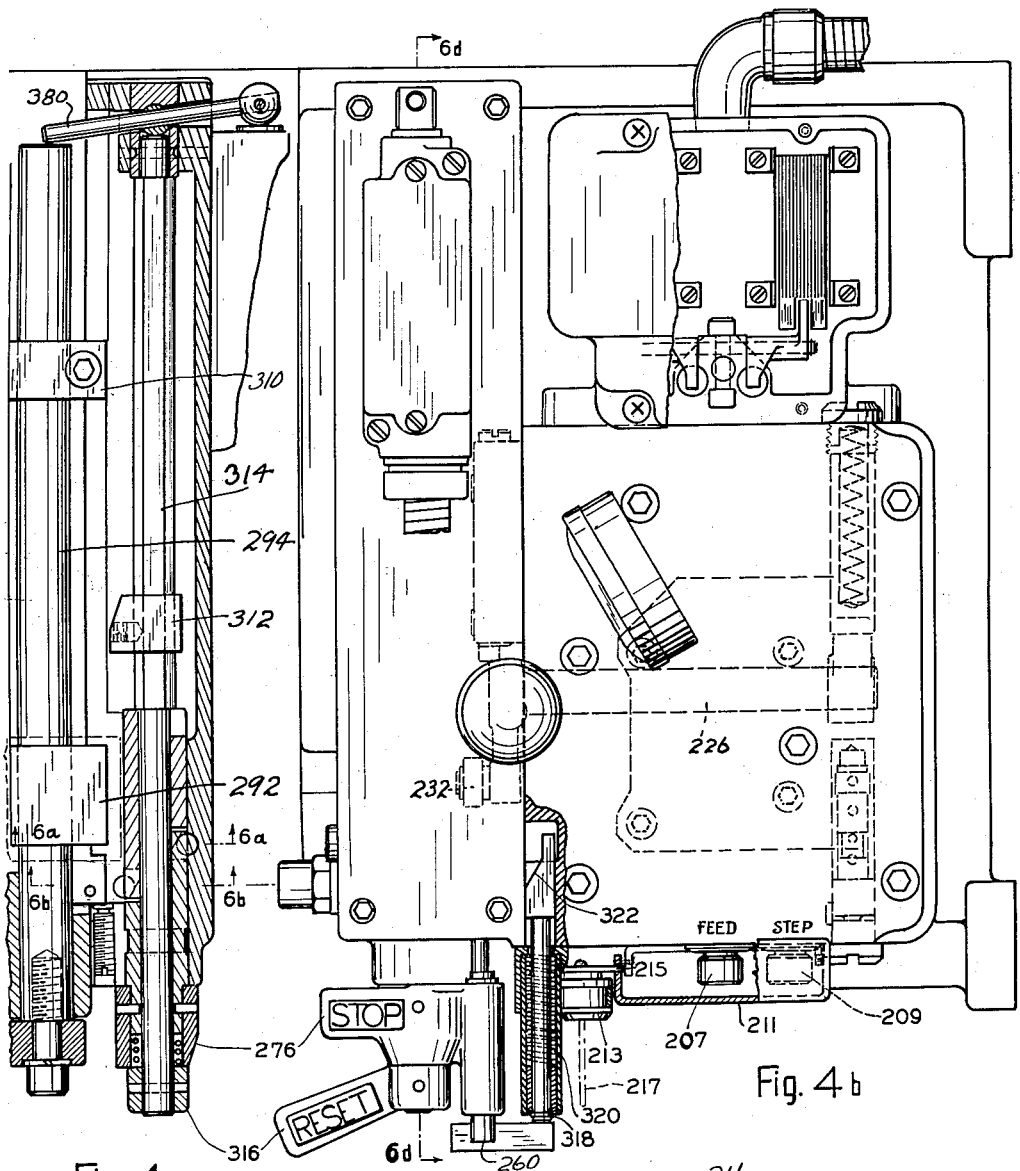
Fig. 4a is a view in elevation of the spindle control rods, parts being in section.
Fig. 4b is a view in elevation illustrating a block or blocks assembled together and making up a part of the control system.
Figure 4C:
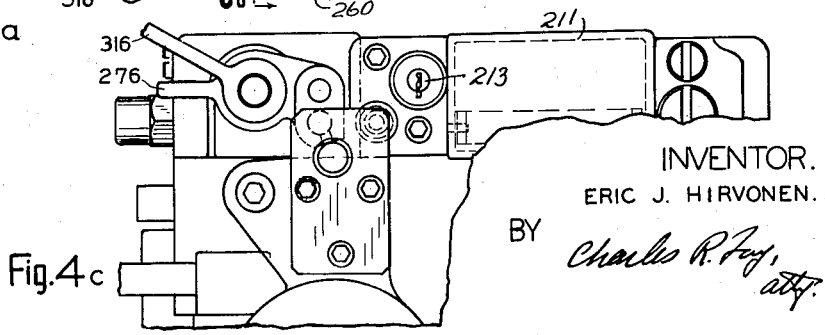
Fig. 4c is a bottom plan view of the subject matter of Fig. 4b, parts being broken away.

Every time block 310 has moved down to cause reversal of the main piston by an extension 311 hitting the top of block 234, the roller 313 contacts inclined plane 344 of click 342 moving it out of engagement (see also Figs. 3c, 3f, 6, 7b and Fig. 15) from notch 350 of reset lever 316 and the preferably hex rod 314. The spring 370 (Fig. 3c) and plunger 371 force reset lever and rod 314 counterclockwise and reset block 312 into the path of friction block 292, causing re-setting of the friction block on the return stroke. When piston 136 of drill spindle unit 143 has closely approached the top position (see Figs. 14, 15, etc. and Fig. 4b), a plunger 318 will be actuated to push reset block out of the path of friction block 292 and in engagement with click 342 and notch 350 to be held in this position until block 310 (and roller 313) again release its grip, or by the operator releasing the lever on the down stroke. The plunger 318 is integral with inclined plane wedge 322 and is held in down position by spring 320. When spindle head 143 on the return stroke engages and pushes up wedge 322, pin 324 will be pushed against reset lever boss 326 (Fig. 3e) and turn reset lever to the right, looking from the front (see arrow Fig. 7b) and into engagement with click 342 and notch 350 and bringing reset block 312 out of the path of friction block 292. Of course if the block 312 is moved to the right by the operator beforehand, no further movement is actuated by inclined plane 322 and plunger 324 is then simply a check to assure that reset block 312 is in the right position, that is out of the path of the friction block 292.

Fig. 7b shows clearly how reset block 312 can be adjusted anywhere on the preferred hexagon rod 314 or at the exact height where the hole to be drilled is to start. Hydraulic means 330 are also provided to keep starting plunger 260 off table, that is, in non-active position when a return stroke is actuated by pushing solenoid 284. Reverse button 286 of solenoid 284 is present in order to ensure safety for the machine or to suspend the usual operation. For this purpose, every surge in line 244 or 245 results in a push on a rod 332 to the left (Fig. 14) impinging on a lug or boss 334 of stop lever 276 forcing it to the left, and insuring that starting pin 260 is out of the path of the returning spindle head 143, for a moment, until return initiation is completed, be it from pushing the return button, operator manually moving levers in wrong position, or plunger 318 moving reset block out of engagement with friction block.

This cycle of mechanical interaction between friction block 292, stop block 310, reset block 312 and regulating block 234 can be conveniently adjusted in various ways.

Figs. 14a, 14b and 14c illustrate the operative relationship between the stop lever 276 and the reset lever 316, see also Figs. 7b and 3a, b and c.

A spring 355 holds lever 276 against a stop pin 356 on lever 316, so that if the stop lever is pushed counterclockwise, the reset lever moves therewith. But the reset lever may be pushed counter-clockwise without necessarily carrying along the stop lever, if held back by hand. The reset lever has a slot-and-pin limiting rotational movement at 358.

In Fig. 14, the levers are shown positioned as normally on return stroke. Fig. 14 shows the positions on the normal rapid advance of feed stroke, and Fig. 14 illustrates the stop lever pushed to the left, which brings the spindle to a stop on the return stroke, preventing the recycling by the reset block.

On special occasions it may be desirable to come to a stop position before the spindle reaches the normal top position. Such an arrangement is shown in Figs. 18a and 18b, 18c, 18d, etc. Stop lever 276 normally carries only a short starting plunger 260, as in Figs. 14–16, etc., but another normally empty, vertical bore is provided at 360 in the collar 277 which carries the stop lever and plunger or pin 260. A section through the collar at this bore is shown in Fig. 18b. A different stop pin 361, having a length equivalent to the distance the spindle head is to be stopped below normal end position, is welded or otherwise connected to a spring plunger 362. A spring 363 holds stop and plunger unit in the bottom position as shown while the other end of the spring is retained by a half slot on a pin 364 and centered by a bushing 365.

If stop lever 276 is in normal position on the return stroke, this new stop pin 361 will hit button 278 and cause pin 280 to bring regulating block 364 to a stop position lower than heretofore by the exact amount of the length of the stop pin 361. By pushing stop lever towards the left as in Fig. 18c, however, stop 361 will be located right above the hole 366, and the spindle head will return to the original stop further up as in Fig. 14. No automatic restart will take place in this case. However, it is often desired to insert a restarting pin 260a longer by the amount of the length of the stop 361 and with such pin 261a and stop 361, normal re-cycling at a lower height is obtained and time saved in the operation of the drill head. The pins 361 and 260a may be of different lengths in sets as indicated as to pin 361 in Fig. 18b.

Another safety device resides in the automatic power cut-off illustrated for instance in Fig. 14 and comprising a lever 380 in the path of rod 294 and struck by the latter to pivot clockwise but only upon the rod 294 reaching an extreme high position not usually reached during the drilling cycle. Such pivoting of lever 380 pushes a plunger switch breaker 382 and interrupts the power lines 384 which may be arranged to shut off the pump as well as inhibiting the solenoids 282 and 284.

Referring to Fig. 6e, the starter valve 390 (or reverse valve 392) is generally shown as comprising an actuator 394 operated by solenoid 282 (or 284) and pressing a plunger type valve stem 396 to control the ports 398 for linking the pressure to the slug valve lines or to sump. The passages necessary are illustrated in Fig. 6c as at 400 but the actual design of the block 402 is not limitative to the invention.

As previously stated, feed valve 208 controls the spindle speed, and step valve 206 controls the depth to which the spindle is pushed by each step. These are easily manually adjusted by the knobs 207 and 209 respectively.

A high flexibility in regulating these valves is desirable and is accomplished by the construction shown in Figs. 12d et seq. The bottom plate 410 is stationary, having a relatively large round hole 411 with a small outwardly pointed V notch 412. The upper valve plate 414 is "floating" and pressed down onto plate 410 by spring 416. Plate 414 rotates by a screw-driver extension 418 of dial knob spindle 420, allowing a slight play between floating plate 414 and the screw-driver end of the knob spindle. A pin 422 in knob 207 (or 209) and a stop 424 in dial 426 limits the circular range. The floating plate also has a stop pin and limiting means in the stationary plate at 428 to allow proper setting of the knob by a set-screw, and an irregular opening 430 allowing wide regulation by slight turning of the knob.

Valve plate 414 is seen to have a beveled edge at 432 about opening 430 and this edge bears down on plate 410 due to the spring, but plate 414 may back off from plate 410 because of the slight distance between the end of the screw-driver 418 and the bottom of screw-driver slot 434. The knob rotates plate 414 and opening 430 rotates relative to the fixed hole 411, between positions of wide open, wherein all of hole 411 and point 412 is exposed, or fully closed position. Between these extremes there is an infinite variety of minute variations, starting with the mere tip of point 412 exposed, etc. Hence an extremely fine adjustment is obtained by the valve as plate 414 is rotated.

It is imperative to assure a clean valve at all times and this construction provides a self-cleaning or flushing means to wash out all impurities every reversal of the pressure cycle. The bottom plate has a circular groove or slot 438, and holes 440 in the plate connect this circular groove with the bottom oil inlet at 442. At every recycling there is a pressure reversal, and oil enters through those holes from the bottom into the groove of the bottom plate and lifts the floating plate 414 off from the bottom plate against the action of spring 416. The oil washes and slushes the surface between the stationary and the floating plates and prevents accumulation of lint or other impurities.

The invention as diagrammatically shown in Figs. 14, 15, 16 and 17 is particularly apparent as a clever combination of parts for a desired result in sturdy and yet very small space. An example of producing the oil channels is shown for the valve block in Fig. 10, et seq. The three sections a, b, c, with all channels cast in place, and the reverse sides shown at e, f and g are evenly surfaced. A sheet of welding material made on brass, german silver, etc. is inserted over the surfaces which are then clamped together, and brought up to temper to be welded. The result is a solid sturdy block needing only slight further machining and all ready to set in place.

The main valve sections 180 with self-regulating valve, initiating plunger unit 250 and guide-piston 236 are similarly shown in Figs. 11a et seq., cast with channels surfaced and machined and held together by sturdy screws and mounted on the inside of main channel and valve casting above described. This main assembly is then fastened oil tight in the spindle casting enclosing the sump space, pumps and other parts. This combination allows compactness, sturdiness and simplicity to be combined to do a complicated job without trouble or attention.

It is seen that the various units of the device are separable and easily assembled or disassembled in case of need. The entire ranges of cycling are easily accomplished by the operator, who can do nothing to harm the machine or the work, regardless of whether various levers or handles are accidentally moved. If the drill seems to cycle too fast for the required cut, a turn of knobs 207 and 209 will bring the feed and speed exactly to the point desired, and the overall flexibility of the machine is readily apparent to those skilled in the art.

A box 211 may be locked over the knobs 207 and 209, and latched by a device 213 having a movable member 215 for this purpose, as well as a key 217 to turn member 215. This is to prevent an operator from changing the knobs once set for a production run, but may of course be dispensed with.

The handle 220 may be actuated at any time by the operator to change from one extreme position of the main valve to the other. That is, during rapid advance the handle may be moved to snap over the point 224 to rapid reverse, and even to stop or feed positions, although the latter intermediate positions are taken care of by other means such as the stop lever 276 and valve 206.

I claim:

1. Apparatus of the class described comprising a tool head, means to reciprocate the same including a cylinder and piston, hydraulic means to operate the piston, a main control valve therefor, means to move the valve through a cycle including a valve actuator, hydraulically responsive means to move the valve actuator to move the valve to reverse upon predetermined increase in hydraulic pressure demand to feed the piston, mechanical means associated with the valve actuator to move the latter and valve to slow feed position, and slip block means on the head to move the mechanical and the hydraulic means to an advance position of the valve, said mechanical means comprising a movable control block, a cam guide surface on the control block, an arm movable by said surface according to movement of the control block under influence of the slip block, the arm being connected to the valve actuator, said slip block moving the control block in the same direction at each reciprocation of the head.

2. Apparatus of the class described comprising a tool head, means to reciprocate the same including a cylinder and piston, hydraulic means to operate the piston, a main control valve therefor, means to move the valve through a cycle including a valve actuator, hydraulically responsive means to move the valve actuator to move the valve to reverse upon predetermined increase in hydraulic pressure demand to feed the piston, mechanical means associated with the valve actuator to move the latter and valve to slow feed position, and means on the head to move the mechanical and the hydraulic means to an advance position of the valve, said mechanical means comprising a movable control block, a curved cam guide surface on the control block, and an arm engaging said surface and movable by said surface according to movement of the block, the arm being connected to the valve actuator, and means to move the control block including a slip block, a rod connected to the tool head, and means to cause the slip block to relatively rise on the rod as the slip block contacts and depresses the control block for slow feed of the tool head, the motion of the control block being slight relative to the movement of the head.

3. Apparatus of the class described comprising a tool head, means to reciprocate the same including a cylinder and piston, hydraulic means to operate the piston, a main control valve therefor, means to move the valve through a cycle including a valve actuator, hydraulically responsive means to move the valve actuator to move the valve to reverse upon predetermined increase in hydraulic pressure demand to feed the piston, mechanical means associated with the valve actuator to move the latter and valve to slow feed position, and means on the head to move the mechanical and the hydraulic means to an advance position of the valve, said mechanical means comprising a movable control block, a cam surface on the block, and an arm engaging and movable by said cam surface according to movement of the control block, the arm being connected to the valve actuator, means to move the block, said last-named means being connected to the head and contacting and depressing the control block at each reversal, means to stop the cycle, and a hydraulic valve to move the main valve to restart the cycle, the hydraulic restarting valve being actuated by the tool head at a substantially retracted position thereof.

4. Apparatus of the class described comprising a tool head, means to reciprocate the same including a cylinder and piston, hydraulic means to operate the piston, a main control valve therefor, means to move the valve through a cycle including a valve actuator, hydraulically responsive means to move the valve actuator to move the valve to reverse upon predetermined increase in hydraulic pressure demand to feed the piston, mechanical means associated with the valve actuator to move the latter and valve to slow feed position, and means on the head to move the mechanical and the hydraulic means to an advance position of the valve, said mechanical means comprising a control block, a slip cam block movable with the tool head, and a stop block both having positions of contact with the control block to move the same, an element connected to the valve actuator to move the latter, and a cam surface on the control block engaging and moving the element according to the movement imparted to the control block by the slip cam block and the stop block.

5. The apparatus of claim 4 wherein the control block surface is arcuate.

6. The apparatus of claim 4 wherein the control block surface is substantially circular.

7. The apparatus of claim 4 wherein the control block is provided with a circular bore forming the surface, and including a roller on the element within the bore and in contact therewith.

8. Apparatus of the class described comprising a reciprocatory tool head, hydraulic means for reciprocating the same, a valve to control the hydraulic means through a cycle of advance, slow feed, reverse, and stop, means to restart the cycle, a valve actuator comprising a control block, a cam surfaced bore therein, an arm having contact with the cam surface of the bore for movement thereby as the control block moves, said arm being connected to the valve actuator, and slip block means movable with the tool head to move the control block through a cycle moving the valve to control the hydraulic means for the first-named cycle.

9. Apparatus of the class described comprising a reciprocatory tool head, hydraulic means for reciprocating the same, a valve to control the hydraulic means through a cycle of advance, slow feed, reverse, and stop, means to restart the cycle, a valve actuator comprising a control block, a cam surfaced bore therein, an arm having contact with the cam surface of the bore for movement thereby as the control block moves, said arm being connected to the valve actuator, a slip block on the tool head to move the control block through a cycle moving the valve to control the hydraulic means for the first-named cycle, and a stop block also on the tool head and in position to engage and move the control block to stop position, said restarting means being actuated by the tool head upon reaching retracted position.

10. Control mechanism for a tool feed having a hydraulic means for operation thereof through a cycle comprising a head, a rod secured to the head and traveling through the cycle therewith, a slip cam block on the rod, a stop block on the rod, a second rod, a lever thereon, means holding the second rod against axial movement and for oscillatory motion, a reset block on the second rod, releasable means holding the latter with the reset block out of the path of the slip cam block, means to release the releasable means, means to throw the second rod upon such release with the reset block in the path of the slip cam block to slide the same relatively down the first-named rod on retractive stroke thereof, to original pre-set location.

11. The control mechanism of claim 10 wherein the means releasing the releasable means is associated with the stop block and including means acting only upon advance of the latter to the position of the releasable means.

12. The control mechanism of claim 10 wherein the means releasing the releasable means is associated with the stop block and acts only upon advance of the latter to the position of the releasable means, and means cycling the head through advance, feed, and reverse, so that the feeding is done in steps, until the stop block reaches the position of the releasable means.

13. The control means of claim 10 including a restarter device and a manually operated stop lever interrupting the action thereof to stop the cycle at the end of the reverse stroke.

14. Apparatus of the class described comprising a cylinder and piston, a main valve therefor, a head reciprocated thereby, means to cycle the head into a step-by-step reciprocation gradually advancing to an extreme and reversing between the steps, means controlling and operating the cycling means and comprising a rod on the head, a slip block on the rod, means to engage and slip the block at each step, resetting means for the slip block means for adjusting the resetting means parallel to the rod, a stop block on the rod, means holding the resetting means out of the path of the slip block and stop block, means to move the resetting block in the path of the slip block, said stop block releasing the resetting block holding means at the end of the cycle to allow the resetting block moving means to operate.

15. The apparatus of claim 14 including a control block moved to stop position by the stop block, a cam on the control block, a member engaging the cam and moved thereby to control the valve.

16. The apparatus of claim 14 including a control block moved to stop position by the stop block, a manual stop lever, a restarting device, means on the head to actuate the restarter at full reverse, said lever being movable to provide against actuation of the last-named means, so that the reciprocation of the head stops.

17. Feeding and control means for a tool head comprising a piston and cylinder to reciprocate the head, a rod reciprocable therewith, a slip cam block on the rod, an adjustable abutment in fixed position to be engaged by the slip block, means in the latter providing for relatively upward slip of the slip block on the rod when the block is engaged with the abutment, a separate control block movable by the slip block in abutment-engaged position thereof, and means to cause said piston to travel at slow feed, said control block operating said last-named means, a cam on the control block, an element engaged with the cam and moved thereby as the control block is moved by the slip-block, said element being connected to actuate said means.

18. Feeding and control means for a reciprocatory tool head comprising a piston and cylinder, a source of pressure therefor, a main valve, a movable control block dependent upon the selective position thereof for throwing the main valve to feed, advance, and neutral positions, a slip block associated with the piston to move the control block to feed position, a plunger engageable by the head at or near the end of the reversal stroke to place the control block in advance position of the main valve, means to move the plunger so as to fail to engage the head, and stop means effective to stop the reciprocation only upon such failure.

19. Feeding and control means according to claim 18 wherein the plunger is replaceable with plungers of different lengths to adjust the position of the head upon change from reverse to advance.

20. Feeding and control means according to claim 18 including a restarter valve to throw the main valve into advance, a plunger to move the restarter valve at or near the end of the reversal stroke, and means to move the plungers together to fail to operate so that stop or neutral position only is attained, and the reciprocation stops.

21. The apparatus of claim 4 including an adjustable stop for engagement by the slip block and limiting the motion of the control block under influence of the slip block.

22. Apparatus of the class described comprising a tool head, means to reciprocate the same including a cylinder and piston, hydraulic means to operate the piston, a main control valve therefor, means to move the valve through a cycle including a valve actuator, hydraulically responsive means to move the valve actuator to move the valve to reverse upon predetermined increase in hydraulic pressure demand to feed the piston, mechanical means associated with the valve actuator to move the latter and valve to slow feed position, and a slip block on the head to engage and move the mechanical and the hydraulic means to an advance position of the valve, said last-named means including a control block having a very slight movement under influence of the slip block, a cam on the control block, and a valve actuator engaged with the cam for motion thereby to move the valve.

References Cited in the file of this patent

UNITED STATES PATENTS

| | | |
|---|---|---|
| 429,664 | Thorpe | June 10, 1890 |
| 1,911,132 | Macomber | May 23, 1933 |
| 2,142,628 | Ballert | Jan. 3, 1939 |
| 2,178,915 | McKee et al. | Nov. 7, 1939 |
| 2,324,727 | Shartle | July 20, 1943 |
| 2,458,290 | Monroe | Jan. 4, 1949 |
| 2,505,224 | Whitcomb | Apr. 25, 1950 |